(12) United States Patent
Jeong et al.

(10) Patent No.: US 10,325,625 B2
(45) Date of Patent: Jun. 18, 2019

(54) MOTION DETECTION FOR A/V RECORDING AND COMMUNICATION DEVICES

(71) Applicant: Ring Inc., Santa Monica, CA (US)

(72) Inventors: Changsoo Jeong, Rancho Palos Verdes, CA (US); Karim Tarazi, Sherman Oaks, CA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 15/359,300

(22) Filed: Nov. 22, 2016

(65) Prior Publication Data

US 2017/0162225 A1 Jun. 8, 2017

Related U.S. Application Data

(60) Provisional application No. 62/289,072, filed on Jan. 29, 2016, provisional application No. 62/263,334, filed on Dec. 4, 2015.

(51) Int. Cl.
| | |
|---|---|
| G11B 20/10 | (2006.01) |
| G11B 20/00 | (2006.01) |
| G11B 31/00 | (2006.01) |
| H04N 5/225 | (2006.01) |
| H04N 5/232 | (2006.01) |

(Continued)

(52) U.S. Cl.
CPC ...... *G11B 20/10527* (2013.01); *G01J 1/4204* (2013.01); *G01J 5/0025* (2013.01); *G01J 5/025* (2013.01); *G01J 5/026* (2013.01); *G01K 3/10* (2013.01); *G08B 13/19* (2013.01); *G08B 13/19695* (2013.01); *G08B 29/185* (2013.01); *G11B 20/00891* (2013.01); *G11B 20/00905* (2013.01); *G11B 31/006* (2013.01); *H04N 5/225* (2013.01); *H04N 5/23222* (2013.01); *H04N 5/76* (2013.01); *H04N 5/77* (2013.01); *H04N 5/772* (2013.01); *H04N 7/186* (2013.01);

(Continued)

(58) Field of Classification Search
CPC ......... G11B 20/10527; G11B 20/00891; G01J 1/4204; G01J 5/0025; G01J 5/26
See application file for complete search history.

(56) References Cited

U.S. PATENT DOCUMENTS

| | | | |
|---|---|---|---|
| 4,764,953 A | 8/1988 | Chern et al. | |
| 5,428,388 A | 6/1995 | von Bauer et al. | |

(Continued)

FOREIGN PATENT DOCUMENTS

| | | |
|---|---|---|
| CN | 2585521 Y | 11/2003 |
| CN | 2792061 Y | 6/2006 |

(Continued)

OTHER PUBLICATIONS

H264 WebCam Introduction. (53 pages).

(Continued)

*Primary Examiner* — Mishawn N. Hunter
(74) *Attorney, Agent, or Firm* — Chong IP Law, LLP

(57) ABSTRACT

Audio/video (A/V) recording and communication devices according to the present embodiments comprise a processor, a motion sensor, and a camera. In various embodiments, the A/V recording and communication devices are configured to reduce latency and/or to reduce false positive indications of motion.

18 Claims, 30 Drawing Sheets

(51) Int. Cl.
*H04N 5/76* (2006.01)
*G01J 5/00* (2006.01)
*G01J 5/02* (2006.01)
*G08B 13/196* (2006.01)
*H04N 7/18* (2006.01)
*G01K 3/10* (2006.01)
*G01J 1/42* (2006.01)
*H04N 5/77* (2006.01)
*G08B 13/19* (2006.01)
*G08B 29/18* (2006.01)

(52) U.S. Cl.
CPC . *G01J 2005/0077* (2013.01); *G08B 13/19656* (2013.01); *G11B 2020/10537* (2013.01)

(56) References Cited

U.S. PATENT DOCUMENTS

| | | | |
|---|---|---|---|
| 5,448,290 A | 9/1995 | VanZeeland | |
| 5,546,072 A * | 8/1996 | Creuseremee | G08B 13/1966 340/514 |
| 5,666,157 A * | 9/1997 | Aviv | G08B 13/19602 348/150 |
| 5,760,848 A | 6/1998 | Cho | |
| 6,028,626 A | 2/2000 | Aviv | |
| 6,072,402 A | 6/2000 | Kniffin et al. | |
| 6,192,257 B1 | 2/2001 | Ray | |
| 6,271,752 B1 | 8/2001 | Vaios | |
| 6,429,893 B1 | 8/2002 | Xin | |
| 6,456,322 B1 | 9/2002 | Marinacci | |
| 6,476,858 B1 | 11/2002 | Ramirez Diaz et al. | |
| 6,633,231 B1 | 10/2003 | Okamoto et al. | |
| 6,658,091 B1 | 12/2003 | Naidoo et al. | |
| 6,696,945 B1 | 2/2004 | Venetianer et al. | |
| 6,707,486 B1 | 3/2004 | Millet et al. | |
| 6,753,774 B2 | 6/2004 | Pan et al. | |
| 6,798,341 B1 * | 9/2004 | Eckel | G01K 1/045 340/12.32 |
| 6,970,183 B1 | 11/2005 | Monroe | |
| 7,062,291 B2 | 6/2006 | Ryley et al. | |
| 7,065,196 B2 | 6/2006 | Lee | |
| 7,085,361 B2 | 8/2006 | Thomas | |
| 7,109,860 B2 | 9/2006 | Wang | |
| 7,161,152 B2 | 1/2007 | DiPoala | |
| 7,193,644 B2 | 3/2007 | Carter | |
| 7,242,423 B2 | 7/2007 | Lin | |
| 7,304,572 B2 | 12/2007 | Sheynman et al. | |
| 7,339,608 B2 | 3/2008 | Ryley et al. | |
| 7,382,249 B2 | 6/2008 | Fancella | |
| 7,417,535 B2 | 8/2008 | Mathews et al. | |
| 7,450,638 B2 | 11/2008 | Iwamura | |
| 7,486,271 B2 | 2/2009 | Hershkovitz et al. | |
| 7,643,056 B2 | 1/2010 | Silsby | |
| 7,683,924 B2 | 3/2010 | Oh et al. | |
| 7,683,929 B2 | 3/2010 | Elazar et al. | |
| 7,738,917 B2 | 6/2010 | Ryley et al. | |
| 8,139,098 B2 | 3/2012 | Carter | |
| 8,144,183 B2 | 3/2012 | Carter | |
| 8,154,581 B2 | 4/2012 | Carter | |
| 8,189,049 B2 | 5/2012 | Lopota et al. | |
| 8,619,136 B2 | 12/2013 | Howarter et al. | |
| 8,780,201 B1 | 7/2014 | Scalisi et al. | |
| 8,804,997 B2 | 8/2014 | Gagvani et al. | |
| 8,823,795 B1 | 9/2014 | Scalisi et al. | |
| 8,842,180 B1 | 9/2014 | Kasmir et al. | |
| 8,872,915 B1 | 10/2014 | Scalisi et al. | |
| 8,922,649 B2 | 12/2014 | Kim | |
| 8,937,659 B1 | 1/2015 | Scalisi et al. | |
| 8,941,736 B1 | 1/2015 | Scalisi et al. | |
| 8,947,530 B1 | 2/2015 | Scalisi | |
| 8,953,040 B1 | 2/2015 | Scalisi et al. | |
| 9,013,575 B2 | 4/2015 | Scalisi | |
| 9,046,414 B2 | 6/2015 | Fadell et al. | |
| 9,049,352 B2 | 6/2015 | Scalisi et al. | |
| 9,053,622 B2 | 6/2015 | Scalisi | |
| 9,055,202 B1 | 6/2015 | Scalisi et al. | |
| 9,058,738 B1 | 6/2015 | Scalisi | |
| 9,060,103 B2 | 6/2015 | Scalisi | |
| 9,060,104 B2 | 6/2015 | Scalisi | |
| 9,062,986 B1 * | 6/2015 | Ellis | G01C 21/36 |
| 9,065,987 B2 | 6/2015 | Kasmir et al. | |
| 9,094,584 B2 | 7/2015 | Scalisi et al. | |
| 9,109,378 B2 | 8/2015 | Scalisi | |
| 9,113,051 B1 | 8/2015 | Scalisi | |
| 9,113,052 B1 | 8/2015 | Scalisi et al. | |
| 9,118,819 B1 | 8/2015 | Scalisi et al. | |
| 9,142,214 B2 | 9/2015 | Scalisi | |
| 9,160,987 B1 | 10/2015 | Kasmir et al. | |
| 9,165,444 B2 | 10/2015 | Scalisi | |
| 9,172,920 B1 | 10/2015 | Kasmir et al. | |
| 9,172,921 B1 | 10/2015 | Scalisi et al. | |
| 9,172,922 B1 | 10/2015 | Kasmir et al. | |
| 9,179,107 B1 | 11/2015 | Scalisi et al. | |
| 9,179,108 B1 | 11/2015 | Scalisi et al. | |
| 9,179,109 B1 | 11/2015 | Kasmir et al. | |
| 9,196,133 B2 | 11/2015 | Scalisi et al. | |
| 9,197,867 B1 | 11/2015 | Scalisi et al. | |
| 9,230,424 B1 | 1/2016 | Scalisi et al. | |
| 9,237,318 B2 | 1/2016 | Kasmir et al. | |
| 9,247,219 B2 | 1/2016 | Kasmir et al. | |
| 9,253,455 B1 | 2/2016 | Harrison et al. | |
| 9,342,936 B2 | 5/2016 | Scalisi | |
| 9,386,281 B2 | 7/2016 | Trundle et al. | |
| 9,398,266 B2 | 7/2016 | Keidar et al. | |
| 9,508,239 B1 | 11/2016 | Harrison et al. | |
| 9,736,284 B2 | 8/2017 | Scalisi et al. | |
| 9,743,049 B2 | 8/2017 | Scalisi et al. | |
| 9,769,435 B2 | 9/2017 | Scalisi et al. | |
| 9,786,133 B2 | 10/2017 | Harrison et al. | |
| 9,799,183 B2 | 10/2017 | Harrison et al. | |
| 2002/0008758 A1 | 1/2002 | Broemmelsiek et al. | |
| 2002/0094111 A1 | 7/2002 | Puchek et al. | |
| 2002/0147982 A1 | 10/2002 | Naidoo et al. | |
| 2002/0163577 A1 | 11/2002 | Myers | |
| 2003/0043047 A1 | 3/2003 | Braun | |
| 2004/0085205 A1 | 5/2004 | Yeh | |
| 2004/0085450 A1 | 5/2004 | Stuart | |
| 2004/0086093 A1 | 5/2004 | Schranz | |
| 2004/0095254 A1 | 5/2004 | Maruszczak | |
| 2004/0135686 A1 | 7/2004 | Parker | |
| 2005/0043907 A1 | 2/2005 | Eckel et al. | |
| 2005/0111660 A1 | 5/2005 | Hosoda | |
| 2006/0010199 A1 | 1/2006 | Brailean et al. | |
| 2006/0022816 A1 | 2/2006 | Yukawa | |
| 2006/0139449 A1 | 6/2006 | Cheng et al. | |
| 2006/0156361 A1 | 7/2006 | Wang et al. | |
| 2007/0008081 A1 | 1/2007 | Tylicki et al. | |
| 2007/0029486 A1 | 2/2007 | Zhevelev et al. | |
| 2007/0173083 A1 * | 7/2007 | Kopplin | H04L 12/403 439/76.1 |
| 2007/0252693 A1 | 11/2007 | Janson | |
| 2009/0327949 A1 | 12/2009 | Subbian et al. | |
| 2010/0195810 A1 | 8/2010 | Mota et al. | |
| 2010/0225455 A1 | 9/2010 | Claiborne et al. | |
| 2010/0235667 A1 * | 9/2010 | Mucignat | G06F 1/3203 713/323 |
| 2011/0102588 A1 * | 5/2011 | Trundle | G08B 13/196 348/143 |
| 2011/0103643 A1 * | 5/2011 | Salsman | G06K 9/00261 382/103 |
| 2011/0156898 A1 | 6/2011 | Taillerfer et al. | |
| 2011/0157358 A1 | 6/2011 | Bell | |
| 2012/0218086 A1 * | 8/2012 | Miller | G08B 13/19 340/10.33 |
| 2013/0053653 A1 * | 2/2013 | Cuddihy | A61B 5/0205 600/301 |
| 2013/0057695 A1 | 3/2013 | Huisking | |
| 2013/0215276 A1 | 8/2013 | Cho | |
| 2014/0088761 A1 | 3/2014 | Shamlian et al. | |
| 2014/0152818 A1 * | 6/2014 | Na | H04N 21/4223 348/143 |
| 2014/0267716 A1 | 9/2014 | Child et al. | |
| 2014/0362225 A1 | 12/2014 | Ramalingamoorthy et al. | |
| 2015/0022344 A1 | 1/2015 | Matsuoka et al. | |

(56) References Cited

U.S. PATENT DOCUMENTS

| | | | |
|---|---|---|---|
| 2015/0022620 A1* | 1/2015 | Siminoff | H04M 11/025 348/14.02 |
| 2015/0029334 A1* | 1/2015 | Scalisi | H04N 7/188 348/143 |
| 2015/0163463 A1 | 6/2015 | Hwang et al. | |
| 2015/0189176 A1* | 7/2015 | Pacurariu | H04N 5/23241 348/143 |
| 2015/0271375 A1* | 9/2015 | Chien | F21V 33/0052 348/159 |
| 2015/0373307 A1* | 12/2015 | Huang | H04N 7/183 348/155 |
| 2016/0100086 A1* | 4/2016 | Chien | H04N 5/2256 348/143 |
| 2016/0300479 A1* | 10/2016 | Modi | G08B 29/183 |

FOREIGN PATENT DOCUMENTS

| | | |
|---|---|---|
| EP | 0944883 B1 | 2/1997 |
| EP | 1480462 A1 | 11/2004 |
| EP | 2587462 A1 | 5/2013 |
| GB | 2286283 A | 8/1995 |
| GB | 2354394 A | 3/2001 |
| GB | 2357387 A | 6/2001 |
| GB | 2400958 A | 10/2004 |
| JP | 2001-103463 | 4/2001 |
| JP | 2002-033839 | 1/2002 |
| JP | 2002-125059 | 4/2002 |
| JP | 2002-342863 | 11/2002 |
| JP | 2002-344640 | 11/2002 |
| JP | 2002-354137 | 12/2002 |
| JP | 2002-368890 | 12/2002 |
| JP | 2003-283696 | 10/2003 |
| JP | 2004-128835 | 4/2004 |
| JP | 2005-341040 | 12/2005 |
| JP | 2006-147650 | 6/2006 |
| JP | 2006-262342 | 9/2006 |
| JP | 2009-008925 | 1/2009 |
| WO | 9839894 | 9/1998 |
| WO | 0113638 A1 | 2/2001 |
| WO | 0129795 A1 | 4/2001 |
| WO | 0193220 A1 | 6/2001 |
| WO | 02085019 A1 | 10/2002 |
| WO | 03028375 A1 | 4/2003 |
| WO | 06038760 A1 | 4/2006 |
| WO | 2006046234 A2 | 5/2006 |
| WO | 2006067782 A1 | 6/2006 |
| WO | 2003096696 A2 | 9/2006 |
| WO | 2007125143 A1 | 11/2007 |

OTHER PUBLICATIONS

CISCO. Cisco Video Surveillance Manager User Guide, Release 6.3. (354 pages).
D-LINK. Wireless N Day & Night Pan/Tilt Cloud Camera DCS-5020L. User Manual. Version 1.0 (Mar. 25, 2013) (58 pages).
AXIS Communications. AXIS Camera Station User's Manual, Rev. 6.0 (Jun. 2009) (63 pages).
AXIS Communications. AXIS Camera Station User's Manual, Rev. 7.0 (Apr. 2010) (70 pages).
GENETEC, Inc. Omnicast 4.4 Administrator Guide. Doc. No. EN.100.005-V4.4.(1) (Mar. 2009) (606 pages).
MOBOTIX. MxControlCenter Professional Video Management. MXCC User Manuel. The HiRes Video Company. V 2.5.3, (Mar. 2013) (392 pages).
MOBOTIX. MXEasy: Point & Shoot. MxEasy User Manual. The HiRes Video Company. (Mar. 2010) (132 pages).
MOBOTIX. MXEasy the Easy-To-User Video Softward. MxEasy User Manual. The HiRes Video Company. (Apr. 2012) (126 pages).
MOBOTIX. Software Camera Manual Part 3 (Oct. 10, 2006) (18 pages).
NUUO. Intelligent Video Surveillance (IVS) (Oct. 2012) (2 pages).
Cisco Small Business Video Monitoring System for SWVMS16 Basic, VM 200-32 Basic Plus, VM 300-xx Advanced Administration Guide. (Copyright 2010 Cisco Systems, Inc.) (220 pages).
CITILOG. MediaTD Brochure. Video-Based Non-Intrusive Real Time Traffic Data Collection Solution. (2012) (2 pages).
Seifried, K. linux-magazine.com, Issue 125. Security Lessons: Secure Video. Secure Video Surveillance. Camera Shy. (Apr. 2011) (2 pages).
Vision Controls Corp. Hybrid Video Recorder User Training Guide. (HVR) Version 2.6.5. (2007) (20 pages).
TUXRADAR LINUX. Build your own CCTV system with Zoneminder. (Jul. 13, 2012) (7 pages).
Esprit 728 Series Control Panels Reference and Installation Manual. (Apr. 2004) (52 pages).

* cited by examiner

MOTION DETECTION FOR A/V RECORDING AND COMMUNICATION DEVICES

CROSS-REFERENCE TO RELATED APPLICATIONS

This application claims priority to provisional application Ser. No. 62/289,072, filed on Jan. 29, 2016, and provisional application Ser. No. 62/263,334, filed on Dec. 4, 2015. The entire contents of the priority applications are hereby incorporated by, reference as if fully set forth.

TECHNICAL FIELD

The present embodiments relate to motion detection in audio/video (A/V) recording and communication devices, including A/V recording and communication doorbells. In particular, the present embodiments relate to improvements in the functionality of A/V recording and communication devices that strengthen the ability of such devices to reduce crime and enhance public safety.

BACKGROUND

Home safety is a concern for many homeowners and renters. Those seeking to protect or monitor their homes often wish to have video and audio communications with visitors, for example, those visiting an external door or entryway. Audio/Video (A/V) recording and communication devices) such as doorbells, provide this functionality, and can also aid in crime detection and prevention. For example, audio and/or video captured by an A/V recording and communication device can be uploaded to the cloud and recorded on a remote server. Subsequent review of the A/V footage can aid law enforcement in capturing perpetrators of home burglaries and other crimes. Further, the presence of one or more A/V recording and communication devices on the exterior of a home, such as a doorbell unit at the entrance to the home, acts as a powerful deterrent against would-be burglars.

SUMMARY

The various embodiments of the present apparatus, systems, and methods for motion detection for audio/video (A/V) recording and communication devices have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

In a first aspect, a method for an audio/video (A/V) recording and communication device is provided, wherein the A/V recording and communication device includes a processor, a motion sensor, and a camera, the method comprising the motion sensor gathering information from within a field of view of the A/V recording and communication device and generating an output signal; the processor transitioning, at a beginning of a sampling interval, from a low-power state to an active state and sampling the output signal from the motion sensor; the processor analyzing the sampled output signal to determine whether motion is indicated within the field of view of the A/V recording and communication device; if no motion is indicated within the field of view of the A/V recording and communication device, then the processor reverting to the low-power state; and if motion is indicated within the field of view of the A/V recording and communication device, then at least one other component of the A/V recording and communication device powering up.

In an embodiment of the first aspect, the if the processor reverts to the low-power state, then the processor waits until a next sampling interval and again transitions from the low-power state to the active state, at a beginning of the next sampling interval, and again samples the output signal from the motion sensor. Also in an embodiment of the first aspect, the at least one other component of the A/V recording and communication device comprises at least one of a Wi-Fi chip, a camera processor, and an image sensor.

In a second aspect, a method for an audio/video (A/V) recording and communication device is provided, wherein the A/V recording and communication device includes a processor, a motion sensor, and a camera, the method comprising the motion sensor gathering information from within a field of view of the A/V recording and communication device and generating an output signal; the processor continually sampling the output signal from the motion sensor at regular sampling intervals; the processor analyzing the sampled output signal to determine whether motion is indicated within the field of view of the A/V recording and communication device; and if motion is indicated within the field of view of the motion sensor, then at least one other component of the A/V recording and communication device powering up.

In an embodiment of the second aspect, the processor is in a low-power state between the sampling intervals. Also in an embodiment of the second aspect, the sampling intervals occur every 15.625 ms. Also in an embodiment of the second aspect, the at least one other component of the A/V recording and communication device comprises at least one of a Wi-Fi chip, a camera processor, and an image sensor.

In a third aspect, an audio/video (A/V) recording and communication device is provided, the A/V recording and communication device comprising a processor; a motion sensor; and a camera; wherein the motion sensor is configured to gather information from within a field of view of the A/V recording and communication device and to generate an output signal based on the gathered information; wherein the processor is configured to transition, at a beginning, of a sampling interval, from a low-power state to an active state, and to sample the output signal from the motion sensor; and wherein the processor is further configured to analyze the sampled output signal to determine whether motion is indicated within the field of view of the A/V recording and communication device, and if no motion is indicated within the field of view of the A/V recording and communication device, then the processor is configured to revert to the low-power state, and if motion is indicated within the field of view of the A/V recording and communication device, then at least one other component of the A/V recording and communication device is configured to power up.

In a fourth aspect, an audio/video (A/V) recording and communication device is provided, the A/V recording and communication device comprising a processor; a motion sensor; and a camera; wherein the motion sensor is configured to gather information from within a field of view of the A/V recording and communication device and to generate an output signal based on the gathered information; wherein the processor is configured to continually sample the output signal from the motion sensor at regular sampling intervals;

and wherein the processor is further configured to analyze the sampled output signal to determine whether motion is indicated within the field of view of the A/V recording and communication device, and if motion is indicated within the field of view of the motion sensor, then at least one other component of the A/V recording and communication device is configured to power up.

In a fifth aspect, a method for an audio/video (A/V) recording and communication device is provided, wherein the A/V recording and communication device includes at least a first and a second motion sensor, the method comprising the first motion sensor detecting a moving object within a field of view of the A/V recording and communication device and generating a first output signal; the second motion sensor detecting the moving object within the field of view of the A/V recording and communication device and generating a second output signal; calculating a time coordinate for a maximum of the first output signal; calculating a time coordinate for a maximum of the second output signal; calculating a spacing between the maximum of the first output signal and the maximum of the second output signal; comparing the spacing between the maximum of the first output signal and the maximum of the second output signal to a threshold value; and if the spacing is less than the threshold value, then determining that the moving object within the field of view of the A/V recording and communication device is likely to be a motor vehicle.

In an embodiment of the fifth aspect, the A/V recording and communication device further includes a processor, and wherein the calculating steps and the comparing step are performed by the processor.

In another embodiment of the fifth aspect, the first motion sensor comprises at least a first passive infrared (PIR) sensor and the second motion sensor comprises at least a second PIR sensor.

In another embodiment of the fifth aspect, the first motion sensor comprises a first field of view and the second motion sensor comprises a second field of view.

In another embodiment of the fifth aspect, the first field of view includes a first portion that does not overlap with the second field of view.

In another embodiment of the fifth aspect, the second field of view includes a second portion that does not overlap with the first field of view.

In a sixth aspect, a method for an audio/video (A/V) recording and communication device is provided, wherein the A/V recording and communication device includes at least a first and a second motion sensor, the method comprising the first motion sensor detecting a moving object within a field of view of the A/V recording and communication device and generating a first output signal; the second motion sensor detecting the moving object within the field of view of the A/V recording and communication device and generating a second output signal; calculating a time coordinate for a maximum of the first output signal; calculating a time coordinate for a maximum of the second output signal; calculating a spacing between the maximum of the first output signal and the maximum of the second output signal; comparing the spacing between the maximum of the first output signal and the maximum of the second output signal to a threshold value; calculating a time coordinate for a minimum of the first output signal; calculating a time coordinate for a minimum of the second output signal; calculating a spacing between the minimum of the first output signal and the minimum of the second output signal; comparing the spacing between the minimum of the first output signal and the minimum of the second output signal to the threshold value; and if either the spacing between the maximum of the first output signal and the maximum of the second output signal or the spacing between the minimum of the first output signal and the minimum of the second output signal is less than the threshold value, then determining that the moving object within the field of vies of the A/V recording and communication device is likely to be a motor vehicle.

In a seventh aspect, an audio/video (A/V) recording and communication device is provided, the A/V recording, and communication device comprising a processor; at least a first motion sensor; and at least a second motion sensor; wherein the first motion sensor is configured to detect a moving object within a field of view of the A/V recording and communication device and to generate a first output signal; wherein the second motion sensor is configured to detect the moving object within the field of view of the A/V recording and communication device and to generate a second output signal; wherein the processor is configured to calculate a time coordinate for a maximum of the first output signal; wherein the processor is further configured to calculate a time coordinate for a maximum of the second output signal; wherein the processor is further configured to calculate a spacing between the maximum of the first output signal and the maximum of the second output signal; and wherein the processor is further configured to compare the spacing between the maximum of the first output signal and the maximum of the second output signal to a threshold value, and if the spacing is less than the threshold value, then, the processor is further configured to determine that the moving object within the field of view of the A/V recording and communication device is likely to be a motor vehicle.

In an embodiment of the seventh aspect, the first motion sensor comprises at least a first passive infrared (PIR) sensor and the second motion sensor comprises at least a second PIR sensor.

In another embodiment of the seventh aspect, the first motion sensor comprises a first field of view and the second motion sensor comprises a second field of view.

In another embodiment of the seventh aspect, the first field of view includes a first portion that does not overlap with the second field of view.

In another embodiment of the seventh aspect, the second field of view includes a second portion that does not overlap with the first field of view.

In an eighth aspect, an audio/video (A/V) recording and communication device is provided, the A/V recording and communication device, comprising a processor; at least a first motion sensor; and at least a second motion sensor; wherein the first motion sensor is configured to detect a moving object within a field of view of the A/V recording and communication device to generate a first output signal; wherein the second motion sensor is configured to detect the moving object within the field of view of the A/V recording and communication device and to generate a second output signal; wherein the processor is configured to calculate a time coordinate for a maximum of the first output signal; wherein the processor is further configured to calculate a time coordinate for a maximum of the second output signal; wherein the processor is further configured to calculate a spacing between the maximum of the first output signal and the maximum of the second output signal; wherein the processor is further configured to compare the spacing between the maximum of the first output signal and the maximum of the second output signal to a threshold value; wherein the processor is further configured to calculate a time coordinate for a minimum of the first output signal;

wherein the processor is further configured to calculate a time coordinate for a minimum of the second output signal; wherein the processor is further configured to calculate a spacing between the minimum of the first output signal and the minimum of the second output signal; wherein the processor is further configured to compare the spacing between the minimum of the first output signal and the minimum of the second output signal to a threshold value; and if either the spacing between the maximum of the first output signal and the maximum of the second output signal or the spacing between the minimum of the first output signal and the minimum of the second output signal is less than the threshold value, then the processor is further configured to determine that the moving object within the field of view of the A/V recording and communication device is likely to be a motor vehicle.

In an embodiment of the eighth aspect, the first motion sensor comprises at least a first passive infrared (PIR) sensor and the second motion sensor comprises at least a second PIR sensor.

In another embodiment of the eighth aspect, the first motion sensor comprises a first field of view and the second motion sensor comprises a second field of view.

In another embodiment of the eighth aspect, the first field of view includes a first portion that does not overlap with the second field of view.

In another embodiment of the eighth aspect, the second field of view includes a second portion that does not overlap with the first field of view.

In a ninth aspect, a method for an audio/video (A/V) recording and communication device is provided, wherein the A/V recording and communication device includes a processor and a motion sensor, the method comprising the motion sensor gathering information within a field of view of the A/V recording and communication device and generating en output signal; the processor sampling the output signal from the motion sensor during a first sampling interval; calculating a magnitude of the output signal during the first sampling interval; the processor sampling the output signal from the motion sensor during a second sampling interval; calculating a magnitude of the output signal during the second sampling interval; calculating a difference between the magnitude of the output signal during the first sampling interval and the magnitude of the output signal during the second sampling interval; comparing the difference between the magnitude of the output signal during the first sampling interval and the magnitude of the output signal during the second sampling interval to a threshold value; and if the difference between the magnitude of the output signal during the first sampling interval and the magnitude of the output signal during the second sampling interval is greater than the threshold value, then determining that the motion sensor is likely exposed to intermittent direct sunlight.

In an embodiment of the ninth aspect, the calculating steps and the comparing step are performed by the processor.

In another embodiment of the ninth aspect, the motion sensor comprises at least one passive infrared (PIR) sensor.

In another embodiment of the ninth aspect, calculating the difference between the magnitude of the output signal during the first sampling interval and the magnitude of the output signal during the second sampling interval determines a rate of change of the output signal from the motion sensor.

In another embodiment of the ninth aspect, the threshold value comprises a threshold rate of change.

Another embodiment of the ninth aspect further comprises determining a peak magnitude of the output signal and comparing the determined peak magnitude to a threshold peak magnitude.

In a tenth aspect, an audio/video (A/V) recording and communication device is provided, the A/V recording and communication device comprising a processor; and a motion sensor; wherein the motion sensor is configured to gather information from within a field of view of the A/V recording and communication device and to generate an output signal based on the gathered information; wherein the processor is configured to sample the output signal from the motion sensor during a first sampling interval; wherein the processor is further configured to calculate a magnitude of the output signal during the first sampling interval; wherein the processor is further configured to sample the output signal from the motion sensor during a second sampling interval; wherein the processor is further configured to calculate a magnitude of the output signal during the second sampling interval; wherein the processor is further configured to calculate a difference between the magnitude of the output signal during the first sampling interval and the magnitude of the output signal during the second sampling interval; and wherein the processor is further configured to compare the difference between the magnitude of the output signal during the first sampling interval and the magnitude of the output signal during the second sampling interval to a threshold value, and, if the difference between the magnitude of the output signal during the first sampling interval and the magnitude of the output signal during the second sampling interval is greater than the threshold value, then the processor is further configured to determine that the motion sensor is likely exposed to intermittent direct sunlight.

In an embodiment of the tenth aspect, the motion sensor comprises at least one passive infrared (PIR) sensor.

In another embodiment of the tenth aspect, calculating the difference between the magnitude of the output signal during the first sampling interval and the magnitude of the output signal during the second sampling interval determines a rate of change of the output signal from the motion sensor.

In another embodiment of the tenth aspect, the threshold value comprises a threshold rate of change.

In another embodiment of the tenth aspect, the processor is further configured to determine a peak magnitude of the output signal and to compare the determined peak magnitude to a threshold peak magnitude.

In an eleventh aspect, a method for an audio/video (A/V) recording and communication device is provided, wherein the A/V recording and communication device includes a processor and a motion sensor, the method comprising the motion sensor gathering information within a field of view of the A/V recording and communication device and generating an output signal; determining a peak magnitude of the output signal; comparing the peak magnitude of the output signal to a threshold value; and if the peak magnitude of the output signal is greater than the threshold value, then determining that the motion sensor is likely exposed to intermittent direct sunlight.

In an embodiment of the eleventh aspect, the determining step and the comparing step are performed by the processor.

In a twelfth aspect, an audio/video (A/V) recording and communication device is provided, the A/V recording and communication device comprising a processor; and a motion sensor; wherein the motion sensor is configured to gather information within a field of view of the A/V recording and communication device and to generate an output signal based on the gathered information; wherein the processor is configured to determine a peak magnitude of the output signal; and wherein the processor is further configured to compare the peak magnitude of the output signal to a threshold value, and if the peak magnitude of the output signal is greater than the threshold value, then the processor is further configured to determine that the motion sensor is likely exposed to intermittent direct sunlight.

In an embodiment of the twelfth aspect, the motion sensor comprises at least one passive infrared (PIR) sensor.

In another embodiment of the twelfth aspect, determining the peak magnitude of the output signal comprises the processor sampling the output signal of the motion sensor over multiple sampling intervals.

In another embodiment of the twelfth aspect, the processor is further configured to determine a rate of change of the output signal from the motion sensor and to compare the determined rate of change to a threshold rate of change.

In a thirteenth aspect, a method for an audio/video (A/V) recording and communication device is provided, wherein the A/V recording and communication device includes a processor, a motion sensor, and a temperature sensor, the method comprising the temperature sensor measuring a change in temperature during an interval; calculating a rate of change in the temperature during the interval; comparing the rate of change in the temperature during the interval to a threshold value; and if the rate of change in the temperature during the interval is greater than the threshold value, then ignoring any signals from the motion sensor that were generated during the interval.

In an embodiment of the thirteenth aspect, the calculating step and the comparing step are performed by the processor.

In another embodiment of the thirteenth aspect, the motion sensor comprises at least one passive infrared (PIR) sensor.

In another embodiment of the thirteenth aspect, the A/V recording and communication device comprises a doorbell.

In another embodiment of the thirteenth aspect, the change in temperature measured by the temperature sensor comprises a change in temperature of a battery of the A/V recording and communication device.

In another embodiment of the thirteenth aspect, the threshold value comprises 1° C./min.

In a fourteenth aspect, an audio/video (A/V) recording and communication device is provided, the A/V recording and communication device comprising a processor; a motion sensor; and a temperature sensor; wherein the temperature sensor is configured to measure a change in temperature during an interval; wherein the processor is configured to calculate a rate of change in the temperature during the interval; and wherein the processor is further configured to compare the rate of change in the temperature during the interval to a threshold value, and if the rate of change in the temperature during the interval is greater than the threshold value, then the processor is further configured to ignore any signals from the motion sensor that were generated during the interval.

In an embodiment of the fourteenth aspect, the motion sensor comprises at least one passive infrared (PIR) sensor.

In another embodiment of the fourteenth aspect, A/V recording and communication device comprises a doorbell.

In another embodiment of the fourteenth aspect, the change in temperature measured by the temperature sensor comprises a change in temperature of a battery of the A/V recording and communication device.

In another embodiment of the fourteenth aspect, the threshold threshold value comprises 1° C./min.

In a fifteenth aspect, a method for an audio/video (A/V) recording and communication device is provided, wherein the A/V recording and communication device includes a processor and a motion sensor, the method comprising the motion sensor detecting a moving object within a field of view of the A/V recording and communication device and generating an output signal; the processor sampling the output signal from the motion sensor over a plurality of sampling intervals; calculating a magnitude of the output signal during each of the sampling intervals; determining whether the magnitude of the output signal is increasing or decreasing over the plurality of sampling intervals; if the magnitude of the output signal is increasing over the plurality of sampling intervals, then determining that the moving object is likely moving toward the A/V recording and communication device; and if the magnitude of the output signal is decreasing over the plurality of sampling intervals, then determining that the moving object is likely moving away from the A/V recording and communication device.

In an embodiment of the fifteenth aspect, the calculation steps and the determining step are performed by the processor.

In another embodiment of the fifteenth aspect, the motion sensor comprises at least one passive infrared (PIR) sensor.

Another embodiment of the fifteenth aspect further comprises, when it is determined that the moving object is likely moving toward the A/V recording and communication device, then generating a user alert.

Another embodiment of the fifteenth aspect further comprises, when it is determined that the moving object is likely moving away from the A/V recording and communication device, then not generating a user alert.

In a sixteenth aspect, an audio/video (A/V) recording and communication device is provided, the A/V recording and communication device comprising a processor; and a motion sensor; wherein the motion sensor is configured to detect a moving object within a field of view of the A/V recording and communication device and to generate an output signal; wherein the processor is configured to sample the output signal from the motion sensor over a plurality of sampling intervals; wherein the processor is further configured to calculate a magnitude of the output signal during each of the sampling intervals; and wherein the processor is further configured to determine whether the magnitude of the output signal is increasing or decreasing over the plurality of sampling intervals, and if the magnitude of the output signal is increasing over the plurality of sampling intervals, then the processor is further configured to determine that the moving object is likely moving toward the A/V recording and communication device, and if the magnitude of the output signal is decreasing over the plurality of sampling intervals, then the processor is further configured to determine that the moving object is likely moving away from the A/V recording and communication device.

In an embodiment of the sixteenth aspect, the motion sensor comprises at least one passive infrared (PIR) sensor.

In another embodiment of the sixteenth aspect, the processor is further configured to generate a user alert when it is determined that the moving object is likely moving toward the A/V recording and communication device.

In another embodiment of the sixteenth aspect, the processor is further configured to not generate a user alert when it is determined that the moving object is likely moving toward the A/V recording and communication device.

In a seventeenth aspect, a method for an audio/video (A/V) recording and communication device is provided, wherein the A/V recording and communication device includes a processor and is plurality of motion sensors, the method comprising at least one of the motion sensors detecting, at a first time, a moving object within a field of view of the A/V recording and communication device; at least one of the motion sensors detecting, at a second time, the moving object within the field of view of the A/V recording and communication device; comparing a first number of the motion sensors that detected the moving object within the field of view of the A/V recording and communication device at the first time and a second number of the motion sensors that detected the moving object within the field of view of the A/V recording and communication device at the second time; if the first number is less than the second number, then determining that the moving object is likely moving toward the A/V recording and communication device; and if the first number is greater than the second number, then determining that the moving object is likely moving away from the A/V recording and communication device.

In an embodiment of the seventeenth aspect, the comparing step is performed by the processor.

In an eighteenth aspect, an audio/video (A/V) recording and communication device is provided, the A/V recording and communication device comprising a processor; and a plurality of motion sensors; wherein at least one of the motion sensors is configured to detect, at a first time, a moving object within a field of view of the A/V recording and communication device; wherein at least one of the motion sensors is configured to detect, at a second time, the moving object within the field of view of the A/V recording and communication device; wherein the processor is configured to compare a first number of the motion sensors that detected the moving object within the field of view of the A/V recording and communication device at the first time and a second number of the motion sensors that detected the moving object within the field of view of the A/V recording and communication device at the second time, and if the first number is less than the second number, then the processor is further configured to determine that the moving object is likely moving toward the A/V recording and communication device, and if the first number is greater than the second number, then the processor is further configured to determine that the moving object is likely moving away from the A/V recording and communication device.

In an embodiment of the eighteenth aspect, the motion sensors comprise passive infrared (PIR) sensor.

In another embodiment of the eighteenth aspect, the processor is further configured to generate a user alert when it is determined that the moving object is likely moving toward the A/V recording and communication device.

In another embodiment of the eighteenth aspect, the processor is further configured to not generate a user alert when it is determined that the moving object is likely moving toward the A/V recording and communication device.

In a nineteenth aspect, a method for all audio/video (A/V) recording and communication device is provided, the A/V recording and communication device including a processor, a motion sensor, and a camera, the method comprising the motion sensor gathering information from within a field of view of the motion sensor and generating an output signal, the processor continually sampling the output signal from the motion sensor at regular sampling intervals, wherein the processor is in a low-power state between the sampling intervals, and wherein the processor transitions, at a beginning of each sampling interval, from a low-power state to an active state without receiving an interrupt signal from the motion sensor, the processor an the sampled output signal to determine whether motion is indicated within the field of view of the motion sensor, and when motion is indicated within the field of view of the motion sensor, then at least one other component of the A/V recording and communication device powering up.

In an embodiment of the nineteenth aspect, the sampling intervals occur every 15.625 ms.

In another embodiment of the nineteenth aspect, the at least one other component of the A/V recording and communication device comprises at least one of a Wi-Fi chip, a camera processor, and an image sensor.

In another embodiment of the nineteenth aspect, the motion sensor comprises at least one passive infrared (PIR) sensor.

In another embodiment of the nineteenth aspect, when motion is indicated within the field of view of the motion sensor, then the processor generates a signal to power up the at least one other component of the A/V recording and communication device, and the at least one other component of the A/V recording and communication device powers op in response to the signal from the processor.

In a twentieth aspect, an audio/video (A/V) recording and communication device is provided, comprising a processor, a motion sensor, and a camera, wherein the motion sensor is configured to gather information from within a field of view of the motion sensor and to generate an output signal based on the gathered information, wherein the processor is configured to continually sample the output signal from the motion sensor at regular sampling intervals, wherein the processor is in a low-power state between the sampling intervals, and wherein the processor transitions, at a beginning of each sampling interval, from a low-power state to an active state without receiving an interrupt signal from the motion sensor, and wherein the processor is further configured to analyze the sampled output signal to determine whether motion is indicated within the field of view of the motion sensor, and when motion is indicated within the field of view of the motion sensor, then at least one other component of the A/V recording and communication device is configured to power up.

In an embodiment of the twentieth aspect, the sampling intervals occur every 15.625 ms.

In another embodiment of the twentieth aspect, the at least one other component of the A/V recording, and communication device comprises at least one of a Wi-Fi chip, a camera processor, and an image sensor.

In another embodiment of the twentieth aspect, the motion sensor comprises at least one passive infrared (PIR) sensor.

In another embodiment of the twentieth aspect, when motion is indicated within the field of view of the motion sensor, then the processor is further configured to generate a signal to power up the at least one other component of the A/V recording and communication device, and the at least one other component of the A/V recording and communication device is further configured to power up in response to the signal from the processor.

In a twenty-first aspect, an audio/video (A/V) recording and communication device is provided, comprising a processor, a motion sensor, and a camera, wherein the motion sensor is configured to gather information from within a field of view of the motion sensor and to generate to output signal based on the gathered information wherein the processor is configured to transition, at a beginning of a sampling interval, from a low-power state to an active state without receiving an interrupt signal from the motion sensor, and the processor in the active state is configured to sample the output signal from the motion sensor, and wherein the processor is further configured to analyze the sampled output signal to determine whether motion is indicated within the field of view of the motion sensor, and if no motion is indicated within the field of view of the motion sensor, then the processor is configured to revert to the low-power state, and if motion is indicated within the field of view of the motion sensor, then at least one other component of the A/V recording and communication device is configured to power up.

In an embodiment of the twenty-first aspect, if the processor reverts to the low-power state, then the processor is further configured to wait until a next sampling interval and again transition, at a beginning of the next sampling interval, from the low-power state to the active state without receiving an interrupt signal from the motion sensor, and again sample the output signal from the motion sensor.

In another embodiment of the twenty-first aspect, the at least one other component of the A/V recording and communication device comprises at least one of a Wi-Fi chip, a camera processor, and an image sensor.

In another embodiment of the twenty-first aspect, the motion sensor comprises at least one passive infrared (PIR) sensor.

In another embodiment of the twenty-first aspect, when motion is indicated within the field of view of the motion sensor, then the processor is further configured to generate a signal to power up the at least one other component of the A/V recording and communication device, and the at least one other component of the A/V recording and communication device is further configured to power up in response to the signal from the processor.

BRIEF DESCRIPTION OF THE DRAWINGS

The various embodiments of the present apparatus, systems, and methods for motion detection for A/V recording and communication devices now will be discussed in detail with an emphasis on highlighting the advantageous features. These embodiments depict the novel and non-obvious apparatus, systems, and methods for motion detection for A/V recording and communication devices shown in the accompanying drawings, which are for illustrative purposes only. These drawings include the following figures, in which like numerals indicate like parts.

DETAILED DESCRIPTION

Figure 1:
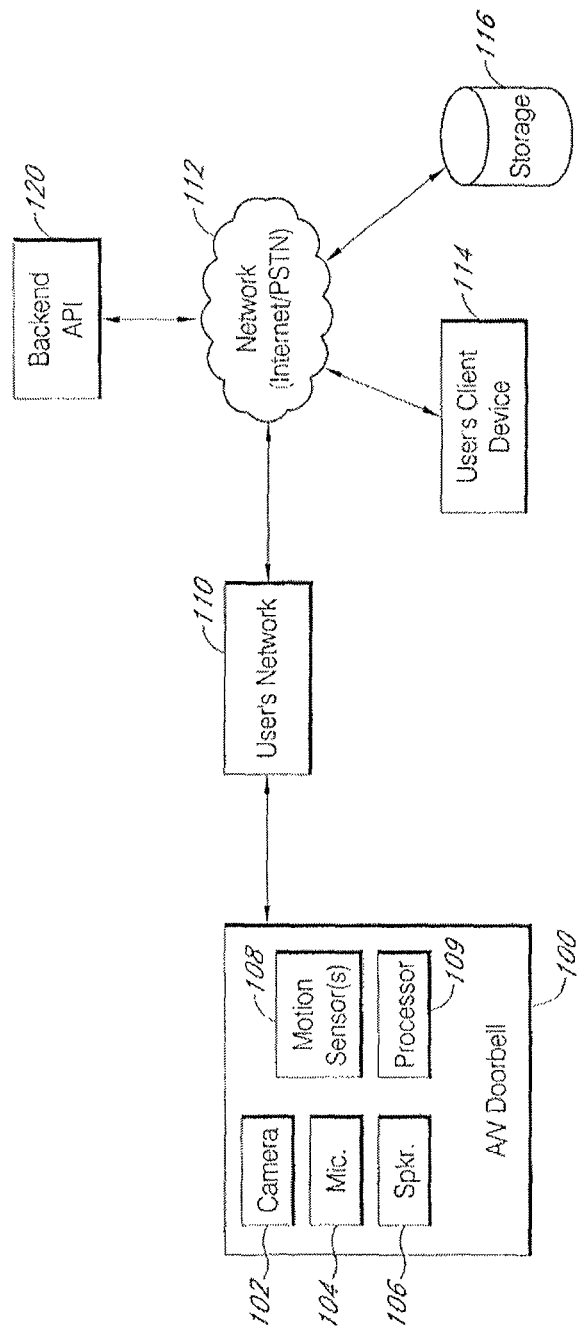
FIG. 1 is a functional block diagram illustrating a system for streaming and storing A/V content captured by an A/V recording and communication device according to the present embodiments.

The following detailed description describes the present embodiments with reference to the drawings. In the drawings, reference numbers label elements of the present embodiments. These reference numbers are reproduced below in connection with the discussion of the corresponding drawing features.

The embodiments of the present apparatus, systems, and methods for motion detection for A/V recording and communication devices are described below with reference to the figures. These figures, and their written descriptions, indicate that certain components of the apparatus are formed integrally, and certain other components are formed as separate pieces. Those of ordinary skill in the art will appreciate that components shown and described herein as being formed integrally may in alternative embodiments be formed as separate pieces. Those of ordinary skill in the art will further appreciate that components shown and described herein as being formed as separate pieces may in alternative embodiments be formed integrally. Further, as used herein the term integral describes a single unitary piece.

With reference to FIG. 1, the present embodiments include an audio/video (A/V) doorbell. While the present disclosure provides numerous examples of methods and systems including A/V recording and communication doorbells, the present embodiments are equally applicable for A/V recording and communication devices other than doorbells. For example, the present embodiments may include one or more A/V recording and communication security cameras instead of, or in addition to, one or more A/V recording and communication doorbells. An example A/V recording and communication security camera may include substantially all of the structure and functionality of the doorbells described herein, but without the front button and related components.

The A/V recording and communication doorbell 100 is typically located near the entrance to a structure (not shown), such as a dwelling, a business, a storage facility, etc. The A/V recording and communication doorbell 100 includes a camera 102, a microphone 104, and a speaker 106. The camera 102 may comprise, for example, a high definition (HD) video camera, such as one capable of capturing video images at an image display resolution of 720 p or better. While not shown, the A/V recording and communication doorbell 100 may also include other hardware and/or components, such as a housing, one or more motion sensors (and/or other types of sensors), a button, etc. The A/V recording and communication doorbell 100 may further include similar componentry and/or functionality as the wireless communication doorbells described in. US Patent Application Publication Nos. 2015/0022620 (application Ser. No. 14/499,828) and 2015/0022618 (application Ser. No. 14/334,922), both of which are incorporated herein by reference in their entireties as if fully set forth.

With further reference to FIG. 1, the A/V recording and communication device 100 communicates with a user's network 110, which may be for example a wired and/or wireless network. If the user's network 110 is wireless, or includes a wireless component, the network 110 may be a Wi-Fi network compatible with the IEEE 802.11 standard and/or other wireless communication standard(s). The user's network 110 is connected to another network 112, which may comprise, for example, the Internet and/or a public switched telephone network (PSTN). As described below, the A/V recording and communication doorbell 100 may communicate with the user's client device 114 via the network 110 and the network 112 (Internet/PSTN). The user's client device 114 may comprise, for example, a mobile telephone (may also be referred to as a cellular telephone), such as a smartphone, a personal digital assistant (PDA), or another communication device. The user's client device 114 comprises a display (not shown) and related components capable of displaying streaming and or recorded video images. The user's client device 114 may also comprise a speaker and related components capable of broadcasting streaming and/or recorded audio, and may also comprise a microphone. The A/V recording and communication doorbell 100 may also communicate with one or more remote storage device(s) 116 (may be referred to interchangeably as "cloud storage device(s)") via the network 110 and the network 112 (Internet/PSTN), one or more servers 118, and/or a backend API (application programming interface) 120 via the user's network 110 and the network 112 (Internet/PSTN). While FIG. 1 illustrates the storage device 116, the server 118, and the backend API 120 as components separate from the network 112, it is to be understood that the storage device 116, the server 118, and/or the backend API 120 may be considered to be components of the network 112.

The network 112 may be any wireless network or any wired network, or a combination thereof, configured to operatively couple the above-mentioned modules, devices, and systems as shown in FIG. 1. For example, the network 112 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access), TDMA (Time Division Multiple Access), FDMA (Frequency Division Multiple Access), and/or OFDMA (Orthogonal Frequency Division Multiple Access) cellular phone networks, GPS, CDPD (cellular digital packet data), RIM (Research in Motion, Limited) duplex paging network, Bluetooth radio, or an IEEE 802.11 based radio frequency network. The network can further include or interface with any one or more of the following: RS-232 serial connection, IEEE-1394 (Firewire) connection, Fibre Channel connection, IrDA (infrared) port, SCSI (Small Computer Systems Interface) connection, USD (Universal Serial Bus) connection, or other wired or wireless, digital or analog, interface or connection, mesh or Digi® networking.

According to one or more aspects of the present embodiments, when a person (may be referred to interchangeably as "visitor") arrives at the A/V recording and communication doorbell 100, the A/V recording and communication doorbell 100 detects the visitor's presence and begins capturing video images within a field of view of the camera 102. The A/V recording and communication doorbell 100 may also capture audio through the microphone 104. The A/V recording and communication doorbell 100 may detect the visitor's presence using a motion sensor, and/or by detecting that the visitor has depressed the button on the A/V recording and communication doorbell 100.

In response to the detection of the visitor, the A/V recording and communication doorbell 100 sends an alert to the user's client device 114 (FIG. 1) via the user's network 110 and the network 112. The A/V recording and communication doorbell 100 also sends streaming video, and may also send streaming audio, to the user's client device 114. If the user answers the alert, two-way audio communication may then occur between the visitor and the user through the A/V recording and communication doorbell 100 and the users client device 114. The user may view the visitor throughout the duration of the call, but the visitor cannot see the user (unless the A/V recording and communication doorbell 100 includes a display, which it may in some embodiments).

The video images captured by the camera 102 of the A/V recording and communication doorbell 100 (and the audio captured by the microphone 104) may be uploaded to the cloud and recorded on the remote storage device 116 (FIG. 1) and/or the server 118. In some embodiments, the video and/or audio may be recorded on the remote storage device 116 and/or the server 118 even if the user chooses to ignore the alert sent to his or her client device 114.

The server 118 may comprise a computer program and/or a machine that waits for requests from other machines or software (clients) and responds to them. A server typically processes data. One purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes. In another example, the network device to which the request is sent may be an API such as the backend API 120, which is described below.

With further reference to FIG. 1, the system may further comprise a backend API 120 including one or more components. A backend API (application programming interface) may comprise, for example, a server (e.g. a real server, or a virtual machine, or a machine running in as cloud infrastructure as a service), or multiple servers networked together, exposing at least one API to client(s) accessing it. These servers may include components such as application servers (e.g., software servers), depending upon what other components are included, such as a caching layer, or database layers, or other components. A backend API may, for example, comprise many such applications, each of which communicate with one another using their public APIs. In some embodiments, the API backend may hold the bulk of the user data and offer the user management capabilities, leaving the clients to have very limited state.

The backend API 120 illustrated FIG. 1 may include one or more APIs. An API is a set of routines, protocols, and tools for building software and applications. An API expresses a software component in terms of its operations, inputs, outputs, and underlying types, defining functionalities that are independent of their respective implementations, which allows definitions and implementations to vary without compromising the interface. Advantageously, an API may provide a programmer with access to an application's functionality without the programmer needing to modify the application itself, or even understand how the application works. An API may be for a web-based system, an operating system, or a database system, and it provides facilities to develop applications for that system using a given programming language. In addition to accessing databases or computer hardware like hard disk drives or video cards, an API can ease the work of programming GUI components. For example, an API can facilitate integration of new features into existing applications (a so-called "plug-in API"). An API can also assist otherwise distinct applications with sharing data, which can help to integrate and enhance the functionalities of the applications.

The backend API 120 illustrated in FIG. 1 may further include one or more services (also referred to as network services). A network service is an application that provides data storage, manipulation, presentation, communication, and/or other capability. Network services are often implemented using a client-server architecture based on application layer network protocols. Each service may be provided by a server component running on one or more computers (such as a dedicated server computer offering multiple services) and accessed via a network by client components running on other devices. However, the client and server components can both be run on the same machine, clients and servers may have a user interface, and sometimes other hardware associated with them.

Figure 2:
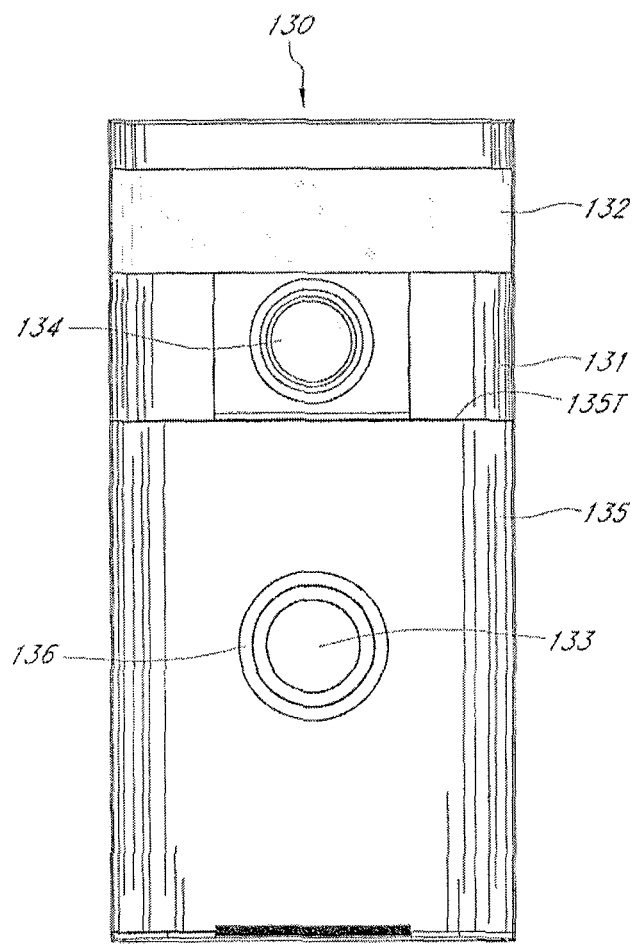
FIG. 2 is a front view of an A/V recording and communication doorbell according to an aspect of the present disclosure.
Figure 3:
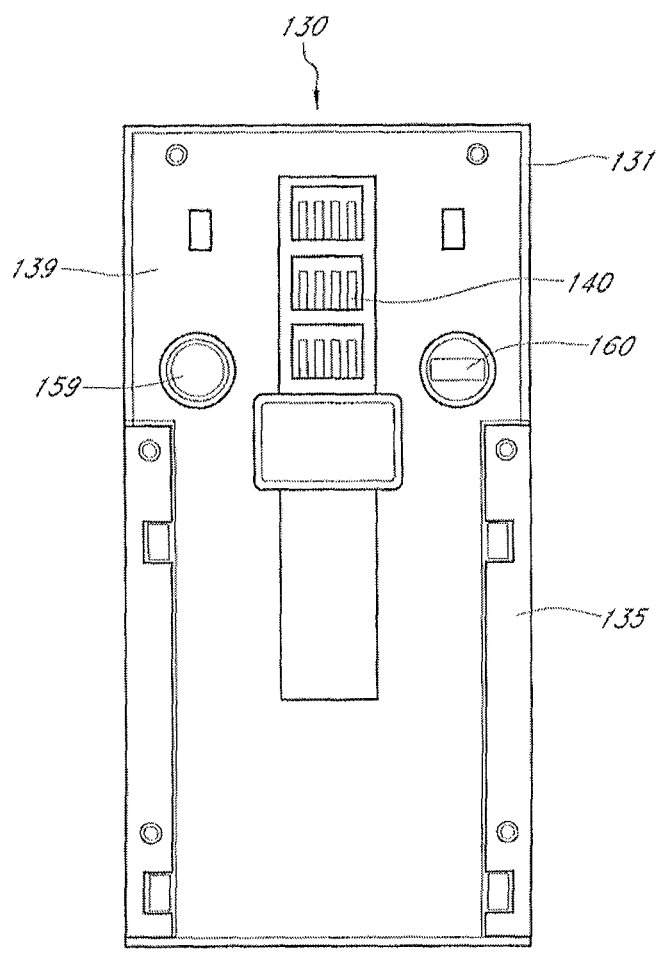
FIG. 3 is a rear view of the A/V recording and communication doorbell of FIG. 2.
Figure 4:
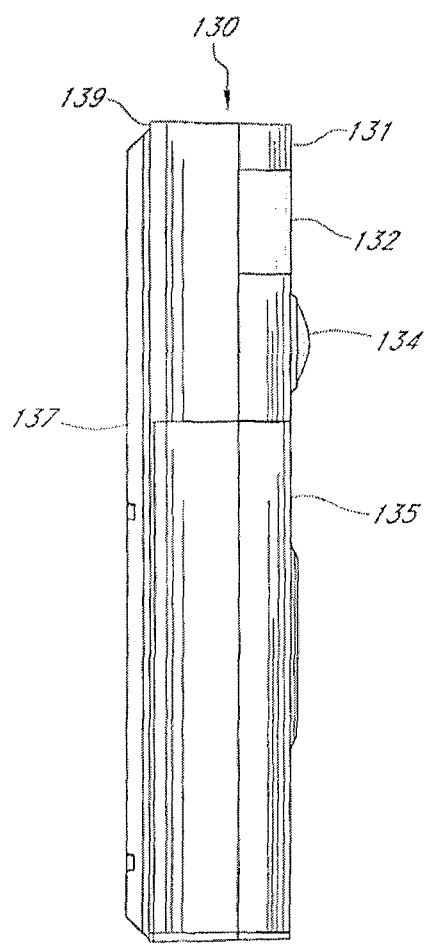
FIG. 4 is a left side view of the A/V recording and communication doorbell of FIG. 2 attached to a mounting bracket according to an aspect of the present disclosure.

FIGS. 2-4 illustrate an audio/video (A/V) communication doorbell 130 according to an aspect of the present embodiments. FIG. 2 is a front view, FIG. 3 is a rear view, and FIG. 4 is a left side view of the doorbell 130 coupled with a mounting bracket 137. The doorbell 130 includes a faceplate 135 mounted to a back plate 139 (FIG. 3). With reference to FIG. 4, the faceplate 135 has a substantially flat profile. The faceplate 135 may comprise any suitable material, including, without limitation, metals, such as brushed aluminum or stainless steel, metal alloys, or plastics. The faceplate 135 protects the internal contents of the doorbell 130 and serves as an exterior front surface of the doorbell 130.

With reference to FIG. 2, the faceplate 135 includes a button 133 and a light pipe 136. The button 133 and the light pipe 136 may have various profiles that may or may not match the profile of the faceplate 135. The light pipe 136 may comprise any suitable material, including, without limitation, transparent plastic, that is capable of allowing light produced within the doorbell 130 to pass through. The light may be produced by one or more light-emitting components, such as light emitting diodes (LED's), contained within the doorbell 130, as further described below. The button 133 may make contact with a button actuator (not shown) located within the doorbell 130 when the button 133 is pressed by a visitor. When pressed, the button 133 may trigger one or more functions of the doorbell 130, as further described below.

With reference to FIGS. 2 and 4, the doorbell 130 further includes an enclosure 131 that engages the faceplate 135. In the illustrated embodiment, the enclosure 131 abuts an upper edge 135T (FIG. 2) of the faceplate 135, but in alternative embodiments one or more gaps between the enclosure 131 and the faceplate 135 may facilitate the passage of sound and/or light through the doorbell 130. The enclosure 131 may comprise any suitable material, but in some embodiments the material of the enclosure 131 preferably permits infrared light to pass through from inside the doorbell 130 to the environment and vice versa. The doorbell 130 further includes a lens 132. In some embodiments, the lens may comprise a Fresnel lens, which may be patterned to deflect incoming light into one or more infrared sensors located within the doorbell 130. The doorbell 130 further in a camera 134, which captures video data when activated, as described below.

FIG. 3 is a rear view of the doorbell 130, according to an aspect of the present embodiments. As illustrated, the enclosure 131 may extend from the front of the doorbell 130 around to the back thereof and may fit snugly around a lip of the back plate 139. The back plate 139 may comprise any suitable material, including, without limitation, metals, such as brushed aluminum or stainless steel, metal alloys, or plastics. The back plate 139 protects the internal contents of the doorbell 130 and serves as an exterior rear surface of the doorbell 130. The faceplate 135 may extend from the front of the doorbell 130 and at least partially wrap around the back plate 139, thereby allowing a coupled connection between the faceplate 135 and the back plate 139. The back plate 139 may have indentations in its structure to facilitate the coupling.

With further reference to FIG. 3, spring contacts 140 may provide power to the doorbell 130 when mated with other conductive contacts connected to a power source. The spring contacts 140 may comprise any suitable conductive material, including, without limitation, copper, and may be capable of deflecting when contacted by an inward force, for example the insertion of a mating element. The doorbell 130 further comprises a connector 160, such as a micro-USB or other connector, whereby power and/or data may be supplied to and from the components within the doorbell 130. A reset button 159 may be located on the back plate 139, and may make contact with a button actuator (not shown) located within the doorbell 130 when the reset button 159 is pressed. When the reset button 159 is pressed, it may trigger one or more functions, as described below.

FIG. 4 is a left side profile view of the doorbell 130 coupled to the mounting bracket 137, according to an aspect of the present embodiments. The mounting bracket 137 facilitates mounting the doorbell 130 to a surface, such as the exterior of a building, such as a home or office. As illustrated in FIG. 4, the faceplate 135 may extend from the bottom of the doorbell 130 up to just below the camera 134, and connect to the back plate 139 as described above. The lens 132 may extend and curl partially around the side of the doorbell 130. The enclosure 131 may extend and curl around the side and top of the doorbell 130, and may be coupled to the back plate 139 as described above. The camera 134 may protrude slightly through the enclosure 131, thereby giving it a wider field of view. The mounting bracket 137 may couple with the back plate 139 such that they contact each other at various points in a common plane of contact, thereby creating an assembly including the doorbell 130 and the mounting bracket 137. The couplings described in this paragraph, and elsewhere, be secured by, for example and without limitation, screws, interference fittings, adhesives, or other fasteners. Interference fittings may refer to a type of connection where a material relies on pressure and/or gravity coupled with the material's physical strength to support a connection to a different element.

Figure 5:
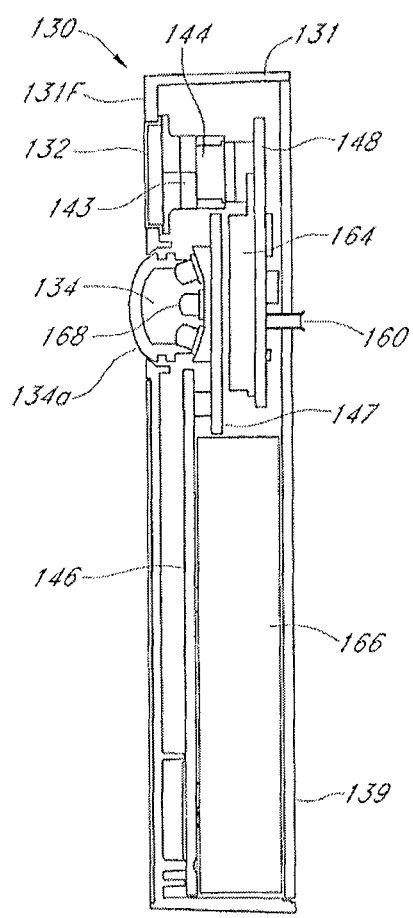
FIG. 5 is cross-sectional right side view of the A/V recording and communication doorbell of FIG. 2.

FIG. 5 is a side cross-sectional view of the doorbell 130 without the mounting bracket 137. In the illustrated embodiment, the lens 132 is substantially coplanar with the front surface 131F of the enclosure 131. In alternative embodiments, the lens 132 may be recessed within the enclosure 131 or may protrude outward from the enclosure 131. The camera 134 is coupled to a camera printed circuit board (PCB) 147, and a lens 134a of the camera 134 protrudes through an opening in the enclosure 131. The camera lens 134a may be a lens capable of focusing light into the camera 134 so that clear images may be taken.

The camera PCB 147 may be secured within the doorbell with any suitable fasteners, such as screws, or interference connections, adhesives, etc. The camera PCB 147 comprises various components that enable the functionality of the camera 134 of the doorbell 130, as described below. Infrared light-emitting components, such as infrared LED's 168, are coupled to the camera PCB 147 and may be triggered to activate when a light sensor detects a low level of ambient light. When activated, the infrared LED's 168 may emit infrared light through the enclosure 131 and/or the camera 134 out into the ambient environment. The camera 134, which may be configured to detect infrared light, may then capture the light emitted by the infrared LED's 168 as it reflects off objects within the camera's 134 field of view, so that the doorbell 130 can clearly capture images at night (may be referred to as "night vision").

With continued reference to FIG. 5, the doorbell 130 further comprises a front PCB 146, which in the illustrated embodiment resides in a lower portion of the doorbell 130 adjacent a battery 166. The front PCB 146 may be secured within the doorbell 130 with any suitable fasteners, such as screws, or interference connections, adhesives, etc. The front PCB 146 comprises various components that enable the functionality of the audio and light components, as further described below. The battery 166 may provide power to the doorbell 130 components while receiving power from the spring contacts 140, thereby engaging in a trickle-charge method of power consumption and supply. Alternatively, the doorbell 130 may draw power directly from the spring contacts 140 while relying on the battery 166 only when the spring contacts 140 are not providing the power necessary for all functions.

With continued reference to FIG. 5, the doorbell 130 further comprises a power PCB 148, which in the illustrated embodiment resides behind the camera PCB 147. The power PCB 148 may be secured within the doorbell 130 with any suitable fasteners, such as screws, or interference connections, adhesives, etc. The power PCB 148 comprises various components that enable the functionality of the power and device-control components, as further described below.

With continued reference to FIG. 5, the doorbell 130 further comprises a communication module 164 coupled to the power PCB 148. The communication module 164 facilitates communication with client devices in one or more remote locations, as further described below. The connector 160 may protrude outward from the power PCB 148 and extend through a hole in the back plate 139. The doorbell 130 further comprises passive infrared (PIR) sensors 144, which are secured on or within a PIR sensor holder 143, and the assembly resides behind the lens 132. The PIR sensor holder 143 may be secured to the doorbell 130 with any suitable fasteners, such as screws, or interference connections, adhesives, etc. The PIR sensors 144 may be any type of sensor capable of detecting and communicating the presence of a heat source within their field of view. Further, alternative embodiments may comprise one or more motion sensors either in place of or in addition to the PIR sensors 144. The motion sensors may be configured to detect motion using any methodology, such as a methodology that does not rely on detecting the presence of a heat source within a field of view.

Figure 6:
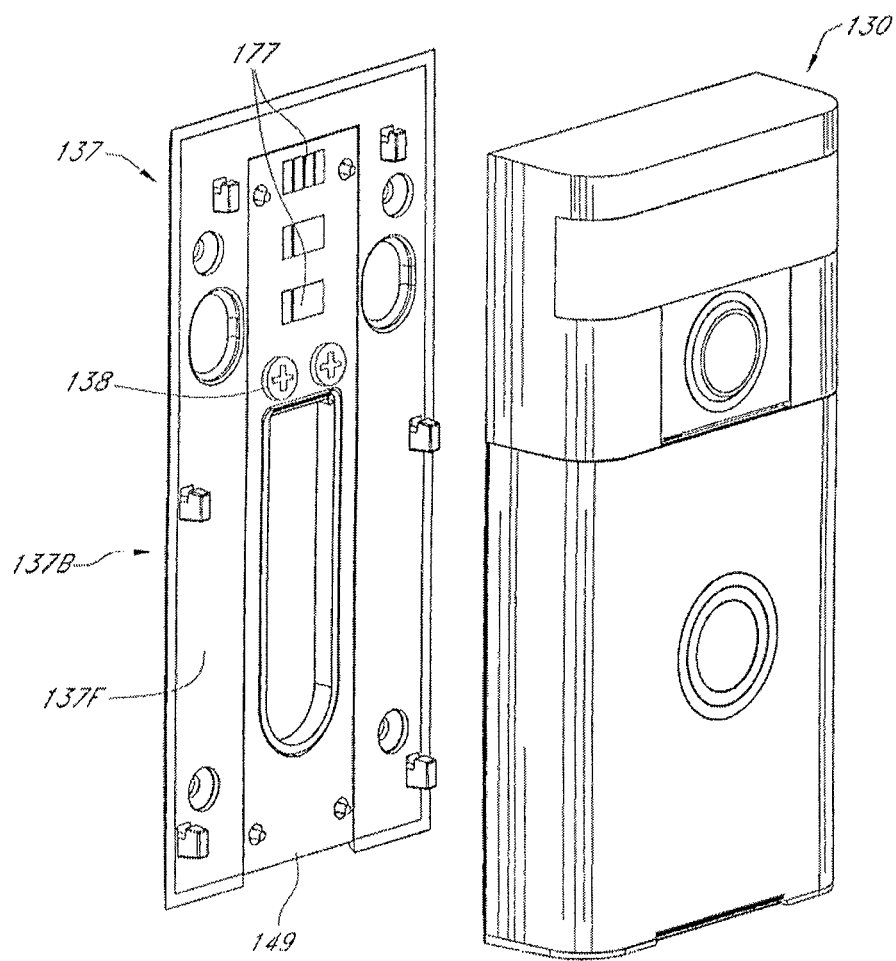
FIG. 6 is an exploded view of the A/V recording and communication doorbell and the mounting bracket or FIG. 4.

FIG. 6 is an exploded view of the doorbell 130 and the mounting bracket 137 according to an aspect of the present embodiments. The mounting bracket 137 is configured to be mounted to a mounting surface (not shown) of a structure, such as a home or an office. FIG. 6 shows the front side 137F of the mounting bracket 137. The mounting bracket 117 is configured to be mounted to the mounting surface such that the back side 137B thereof faces the mounting surface. In certain embodiments the mounting bracket 137 may be mounted to surfaces of various composition, including, without limitation, wood, concrete, stucco, brick, vinyl siding, aluminum siding, etc., with any suitable fasteners, such as screws, or interference connections, adhesives, etc. The doorbell 130 may be coupled to the mounting bracket 137 with any suitable fasteners, such as screws, or interference connections, adhesives, etc.

With continued reference to FIG. 6, the illustrated embodiment of the mounting bracket 137 includes the terminal screws 138. The terminal screws 138 are configured to receive electrical wires adjacent the mounting surface of the structure upon which the mounting bracket 137 is mounted, so that the doorbell 130 may receive electrical power from the structure's electrical system. The terminal screws 138 are electrically connected to electrical contacts 177 of the mounting bracket. If power is supplied to the terminal screws 138, then the electrical contacts 177 also receive power through the terminal screws 138. The electrical contacts 177 may comprise any suitable conductive material, including, without limitation, copper, and may protrude slightly from the face of the mounting bracket 137 so that they may mate with the spring contacts 140 located on the back plate 139.

Figure 7:
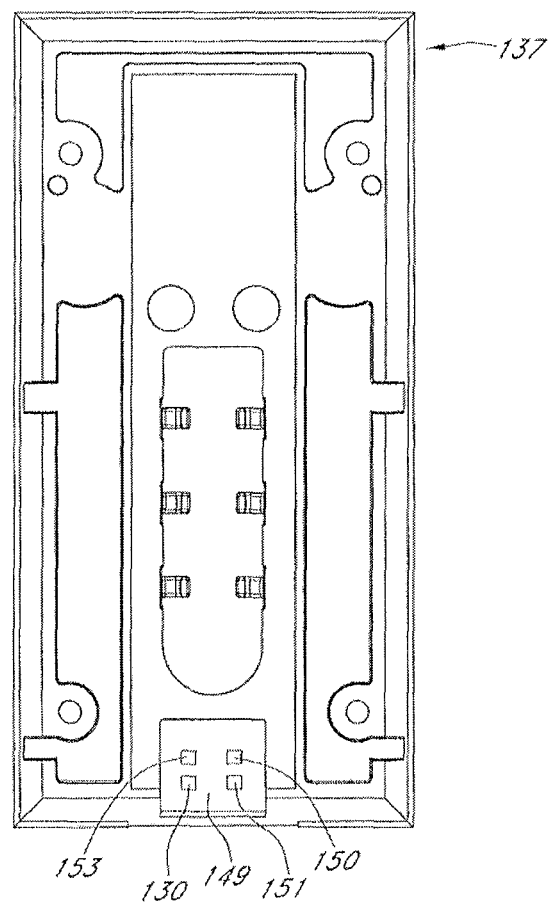
FIG. 7 is a rear view of the mounting bracket of FIG. 4.

With reference to FIGS. 6 and 7 (which is a rear view of the mounting bracket 137), the mounting bracket 137 further comprises a bracket PCB 149. With reference to FIG. 7, the bracket PCB 149 is situated outside the doorbell 130, and is therefore configured for various sensors that measure ambient conditions, such as an accelerometer 150, a barometer 151, a humidity sensor 152, and a temperature sensor 153. The functions of these components are discussed in more detail below. The bracket PCB 149 may be secured to the mounting bracket 137 with any suitable fasteners, such as screws, or interference connections, adhesives, etc.

Figure 8A:
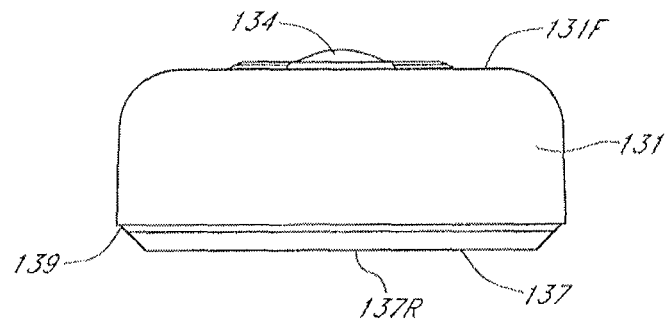
FIGS. 8A and 8B are top and bottom views, respectively, of the A/V recording and communication doorbell and the mounting bracket of FIG. 4.
Figure 8B:
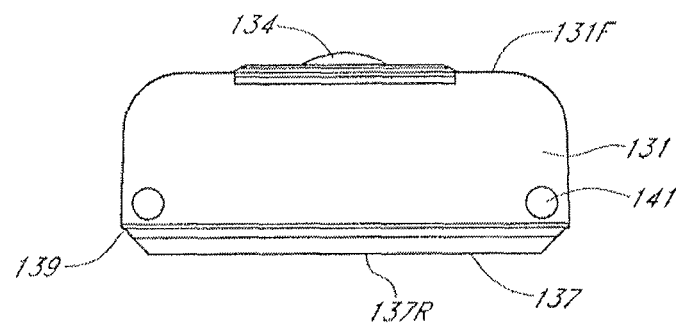

FIGS. 8A and 8B are top and bottom views, respectively, of the doorbell 130. As described above, the enclosure 131 may extend from the front face 131F of the doorbell 130 to the back, where it contacts and snugly surrounds the back plate 139. The camera 134 may protrude slightly beyond the front face 131F of the enclosure 131, thereby giving the camera 134 a wider field of view. The mounting bracket 137 may include a substantially flat rear surface 137R, such that the doorbell 130 and the mounting bracket 137 assembly may sit flush against the surface to which they are mounted. With reference to FIG. 8B, the lower end of the enclosure 131 may include security screw apertures 141 configured to receive screws or other fasteners.

Figure 9A:
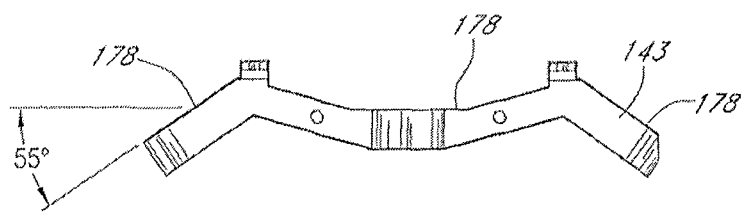
FIGS. 9A and 9B are top and front views, respectively, of a passive infrared sensor holder of the A/V recording and communication doorbell of FIG. 2.

FIG. 9A is a top view of the PIR sensor holder 143. The PIR sensor holder 143 may comprise any suitable material, including, without limitation, metals, metal or plastics. The PIR sensor holder 143 is configured to mount the PIR sensors 144 behind the lens 132 such that the PIR sensors 144 face out through the lens 132 at varying angles, thereby creating a wide field of view for the PIR sensors 144, and dividing the field of view into zones, as further described below. With further reference to FIG. 9A, the PIR sensor holder 143 includes one or more faces 178 within or on which the PIR sensors 144 may be mounted. In the illustrated embodiment, the PIR sensor holder 143 includes three faces 178, with each of two outer faces 178 angled at 55° with respect to a center one of the faces 178. In alternative embodiments, the angle formed by adjacent ones of the faces 178 may be increased or decreased as desired to alter the field of view of the PIR sensors 144.

Figure 9B:
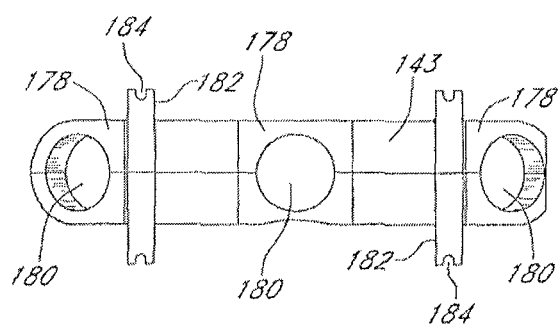

FIG. 9B is a front view of the PIR sensor holder 143. In the illustrated embodiment, each of the faces 178 includes a through hole 180 in which the PIR sensors 144 may be mounted. First and second brackets 182, spaced from one another, extend transversely across the PIR sensor holder 143. Each of the brackets 182 includes notches 184 at either end. The brackets 182 may be used to secure the PIR sensor holder 143 within the doorbell 130. In alternative embodiments, the through holes 180 in the faces 178 may be omitted. For example, the PIR sensors 144 may be mounted directly to the faces 178 without the through holes 180. Generally, the faces 178 may be comprise any structure configured to locate and secure the PIR sensors 144 in place.

Figure 10A:
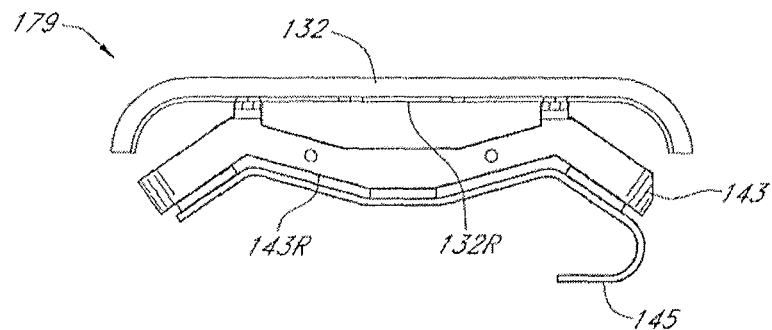
FIGS. 10A and 10B are top and front views respectively, of a passive infrared sensor holder assembly of the A/V recording and communication doorbell of FIG. 2.
Figure 10B:
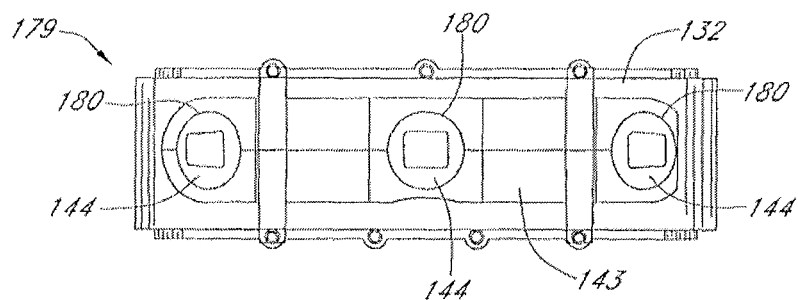

FIGS. 10A and 10B are top and front views, respectively, of a PIR sensor assembly 179, including the PIR sensor holder 143, the lens 132, and a flexible power circuit 145. The PIR sensor holder 143 may be secured to a rear face 132R of the lens 132, as shown, with the brackets 182 abutting the rear face 132R of the lens 132. The flexible power circuit 145, which may be any material or component capable of delivering power and/or data to and from the PIR sensors 144, is secured to a rear face 143R of the PIR sensor holder 143, and may be contoured to match the angular shape of the PIR sensor holder 143. The flexible power circuit 145 may connect to, draw power from, and/or transmit data to and/or from, the power PCB 148 (FIG. 5).

Figure 11:
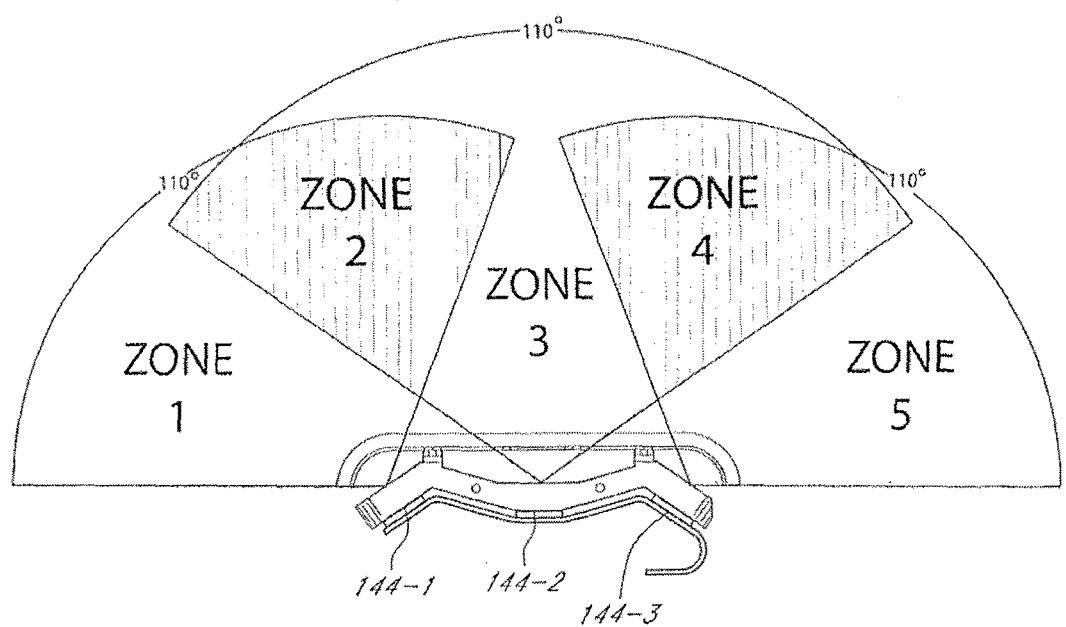
FIG. 11 is a top view of the passive infrared sensor assembly of FIG. 10A and a field of view thereof according to an aspect of the present disclosure.

FIG. 11 is a top view of the PIR sensor assembly 179 illustrating the fields of view of the PIR sensors 144. Each PIR sensor 144 in a field of view, referred to as a "zone," that traces an angle extending outward from the respective PIR sensor 144. Zone 1 is the area that is visible only to Passive Infrared Sensor 144-1. Zone 2 is the area that is visible only to the PIR sensors 144-1 and 144-2. Zone 3 is the area that is visible only to Passive Infrared Sensor 144-2. Zone 4 is the area that is visible only to the PIR sensors 144-2 and 144-3. Zone 5 is the area that is visible only to Passive Infrared Sensor 144-3. The doorbell 130 may be capable of determining the direction that an object is moving based upon which zones are triggered in a time sequence. In the illustrated embodiment, each zone extends across an angle of 110°. In alternative embodiments, each zone may extend across a different angle, such as one greater than or less than 110°.

Figure 12:
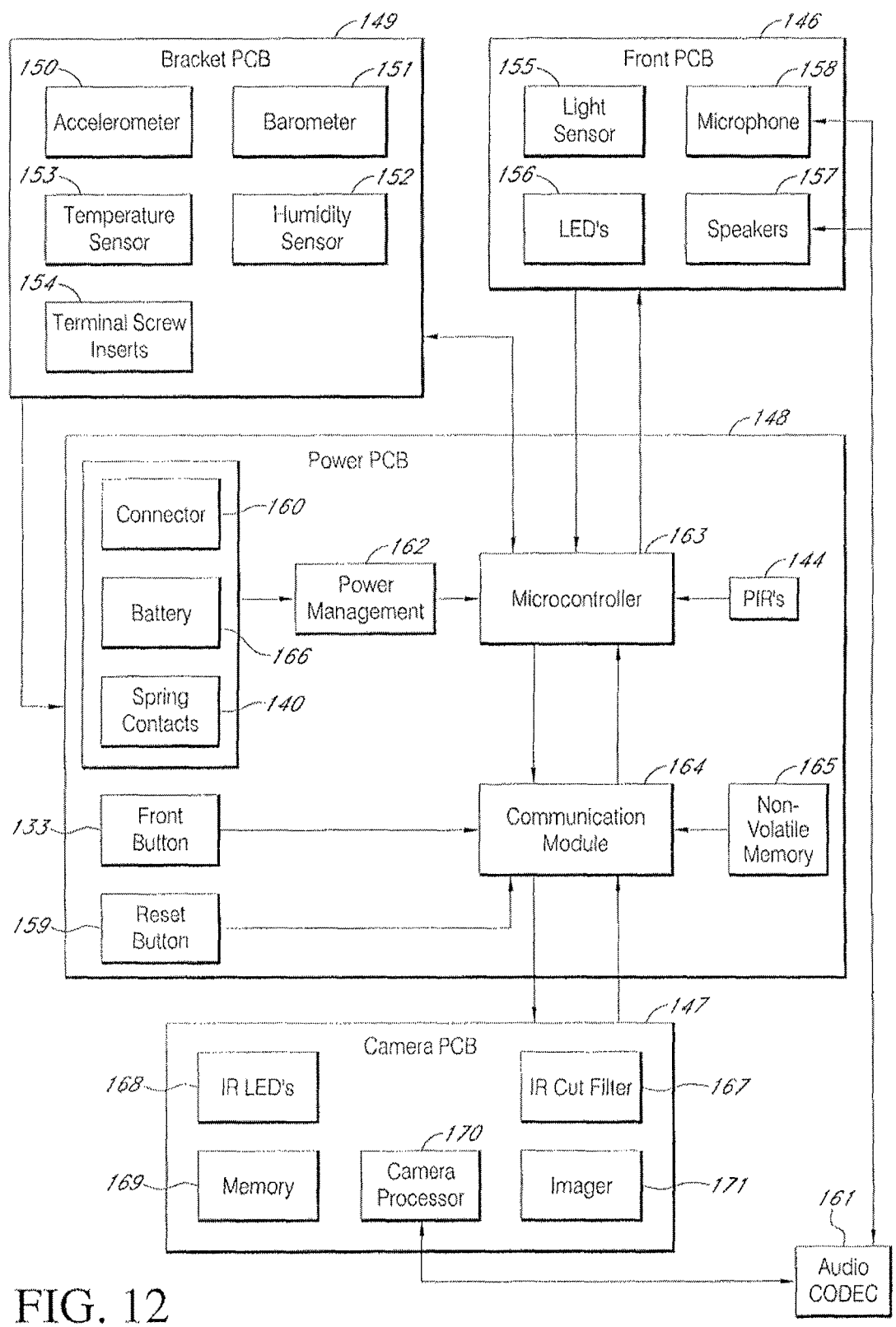
FIG. 12 a functional block diagram of the components of the A/V recording and communication doorbell of FIG. 2.

FIG. 12 is a functional block diagram of the components within or in communication with the doorbell 130, according to an aspect of the present embodiments. As described above, the bracket PCB 149 may comprise an accelerometer 150, a barometer 151, a humidity sensor 152, and a temperature sensor 153. The accelerometer 150 may be one or more sensors capable of sensing motion and/or acceleration. The barometer 151 may be one or more sensors capable of determining the atmospheric pressure of the surrounding environment in which the bracket PCB 149 may be located. The humidity sensor 152 may be one or more sensors capable of determining the amount of moisture present in the atmospheric environment in which the bracket PCB 149 may be located. The temperature sensor 153 may be one or more sensors capable of determining the temperature of the ambient environment in which the bracket PCB 149 may be located. As described above, the bracket PCB 149 may be located outside the housing of the doorbell 130 so as to reduce interference from heat, pressure, moisture, and/or other stimuli generated by the internal components of the doorbell 130.

With further reference to FIG. 12, the bracket PCB 149 may further comprise terminal screw inserts 154, which may be configured to receive the terminal screws 138 and transmit power to the electrical contacts 177 on the mounting bracket 137 (FIG. 6). The bracket PCB 149 may be electrically and/or mechanically coupled to the power PCB 148 through the terminal screws 138, the terminal screw inserts 154, the spring contacts 140, and the electrical contacts 177. The terminal screws 138 may receive electrical wires located at the surface to which the doorbell 130 is mounted, such as the wall of a building, so that the doorbell can receive electrical power from the building's electrical system. Upon the terminal screws 138 being secured within the terminal screw inserts 154, power may be transferred to the bracket PCB 149, and to all of the components associated therewith, including the electrical contacts 177. The electrical contacts 177 may transfer electrical power to the power PCB 148 by mating with the spring contacts 140.

With further reference to FIG. 12, the front PCB 146 may comprise a light sensor 155, one or more light-emitting components, such as LED's 156, one or more speakers 157, and a microphone 158. The light sensor 155 may be one or more sensors capable of detecting the level of ambient light of the surrounding environment in which the doorbell 130 may be located. LED's 156 may be one or more light-emitting diodes capable of producing visible light when supplied with power. The speakers 157 may be any electromechanical device capable of producing sound in response to an electrics signal input. The microphone 158 may be an acoustic-to-electric transducer or sensor capable of converting sound waves into an electrical signal. When activated, the LED's 156 may illuminate the light pipe 136 (FIG. 2). The front PCB 146 and all components thereof may be electrically coupled to the power PCB 148, thereby allowing data and/or power to be transferred to and from the power PCB 148 and the front PCB 146.

The speakers 157 and the microphone 158 may be coupled to the camera processor 170 through an audio CODEC 161. For example, the transfer of digital audio from the user's client device 114 and the speakers 157 and the microphone 158 may be compressed and decompressed using the audio CODEC 161, coupled to the camera processor 170. Once compressed by audio CODEC 161, digital audio data may be sent through the communication module 164 to the network 112, routed by one or more servers (not shown), and delivered to the user's client device 114. When the user speaks, after being transferred through the network 112, digital audio data is decompressed by audio CODEC 161 and emitted to the visitor via the speakers 157.

With further reference to FIG. 12, the power PCB 148 may comprise a power management module 162, a microcontroller 163, the communication module 164, and power PCB non-volatile memory 165. In certain embodiments, the power management module 162 may comprise an integrated circuit capable of arbitrating between multiple voltage rails, thereby selecting the source of power for the doorbell 130. The battery 166, the spring contacts 140, and/or the connector 160 may each provide power to the power management module 162. The power management module 162 may have separate power rails dedicated to the battery 166, the spring contacts 140, and the connector 160. In one aspect of the present disclosure, the power management module 162 may continuously draw power from the battery 155 to power the doorbell 130, while at the same time routing power from the spring contacts 140 and/or the connector 160 to the battery 166, thereby allowing the battery 166 to maintain a substantially constant level of charge. Alternatively, the power management module 162 may continuously draw power from the spring contacts 140 and/or the connector 160 to power the doorbell 130, while only drawing from the battery 166 when the power from the spring contacts 140 and/or the connector 160 is low or insufficient. The power management module 162 may also serve as a conduit for data between the connector 160 and the microcontroller 163.

With further reference to FIG. 12, in certain embodiments the microcontroller 163 may comprise an integrated circuit including a processor core, memory, and programmable input/output peripherals. The microcontroller 163 may receive input signals, such as data and/or power, from the PIR sensors 144, the bracket PCB 149, the power management module 152, the light sensor 155, the microphone 158, and/or the communication module 164, and may perform various functions as further described below. When the microcontroller 163 is triggered by the PIR sensors 144, the microcontroller 163 may be triggered to perform one or more functions, such as those described below with reference to FIG. 14. When the light sensor 155 detects a low level of ambient light, the light sensor 155 may trigger the microcontroller 163 to enable "night vision," as further described below. The microcontroller 163 may also act as a conduit for data communicated between various components and the communication module 164.

With further reference to FIG. 12, the communication module 164 may comprise an integrated circuit including a processor core, memory, and programmable input/output peripherals. The communication module 164 may also be configured to transmit data wirelessly (and/or over a wired connection) to a remote network device, and may include one or more transceivers (not shown). The wireless communication may comprise one or more wireless networks, such as, without limitation, Wi-Fi, cellular, Bluetooth, and/or satellite networks. The communication module 144 may receive inputs, such as power and/or data, from the camera PCB 147, the microcontroller 163, the button 133, the reset button 159, and/or the power PCB non-volatile memory 165. When the button 133 is pressed, the communication module 164 may be triggered to perform one or more functions, such as those described below with reference to FIG. 13. When the reset button 159 is pressed, the communication module 164 may be triggered to erase any data stored at the power PCB non-volatile memory 165 and/or at the camera PCB memory 159. The communication module 154 may also act as a conduit for data communicated between various components and the microcontroller 153. The power PCB non-volatile memory 165 may comprise flash memory configured to store and/or transmit data. For example, in certain embodiments the power PCB non-volatile memory 165 may comprise serial peripheral interface (SPI) flash memory.

With further reference to FIG. 12, the camera PCB 147 may comprise components that facilitate the operation of the camera 134. For example, an imager 171 may comprise a video recording sensor and/or a camera chip. In one aspect of the present disclosure, the imager 171 may comprise a complementary metal-oxide semiconductor (CMOS) array, and may be capable of recording high definition (720 p or better) video files. A camera processor 170 may comprise an encoding and compression chip. In some embodiments, the camera processor 170 may comprise a bridge processor. The camera processor 170 may process video recorded by the imager 171 and audio recorded try the microphone 158, and may transform this data into a form suitable for wireless transfer by the communication module 164 to a network. The camera PCB memory 169 may comprise volatile memory that may be used when data is being buffered or encoded by the camera processor 170. For example, in certain embodiments the camera PCB memory 169 may comprise synchronous dynamic random access memory (SD RAM). IR LED's 168 may comprise light-emitting diodes capable of radiating infrared light. IR cut filter 167 may comprise a system that, when triggered, configures the imager 171 to see primarily infrared light as opposed to visible light. When the light sensor 155 detects a low level of ambient light (which may comprise a level that impedes the performance of the imager 171 in the visible spectrum), the IR LED's 168 may shine infrared light through the doorbell 130 enclosure out to the environment, and the IR cut filter 167 may enable the imager 171 to see this infrared light as it is reflected or refracted off of objects within the field of view of the doorbell. This process may provide the doorbell 130 with the "night vision" function mentioned above.

Figure 13:
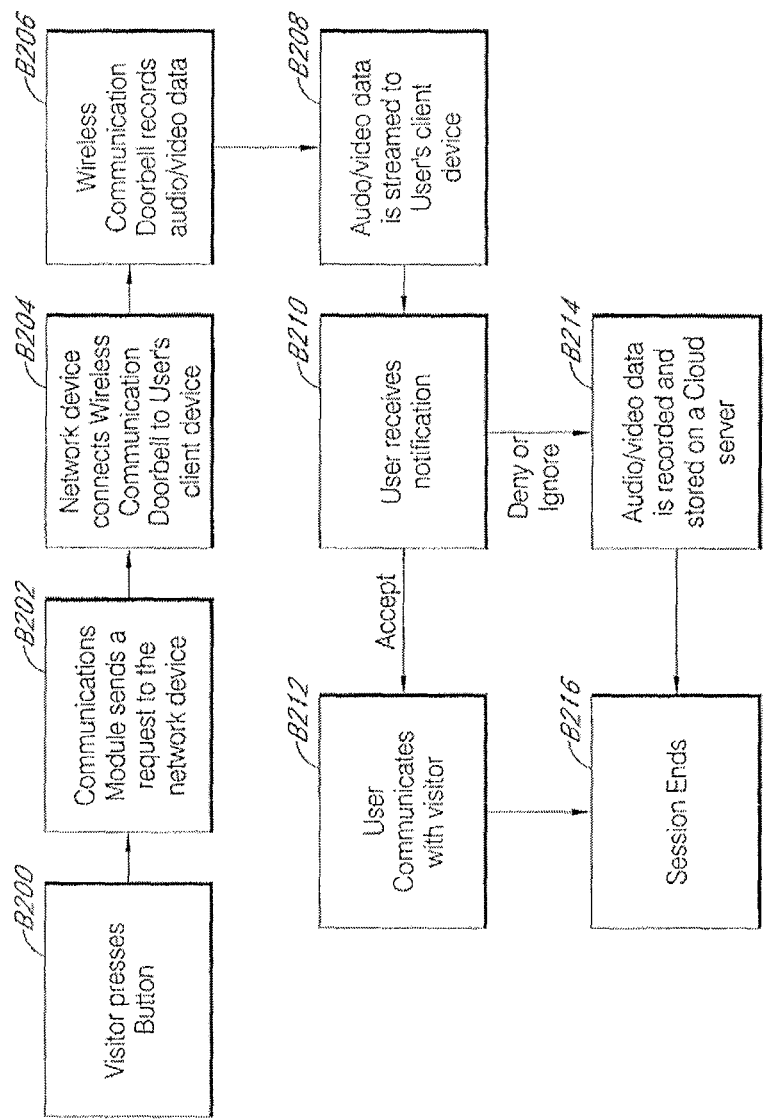
FIG. 13 is a flowchart illustrating a process for an A/V recording and communication doorbell according to an aspect of the present disclosure.

FIG. 13 is a flowchart illustrating one embodiment of a process according to an aspect of the present disclosure. At block B200, a visitor presses the button 133 on the doorbell 130. At block B202, the communication module 164 sends a request to a network device. Once the network device receives the request, at block B204 the network device may connect the doorbell 130 to the user's client device 114 through the user's network 110 and the network 112. In block B206, the doorbell 130 may record available audio and/or video data using the camera 134, the microphone 158, and/or any other sensor available. At block B208, the audio and/or video data is transmitted to the user's client device 114. At block B210, the user may receive a notification on his or her client device 114 prompting him or her to either accept or deny. If the user denies the notification, then the process advances to block B214 where the audio and/or video data is recorded and stored at a cloud server. The session then ends at block B216 and the connection between the doorbell 130 and the user's client device 114 is terminated. If, however, the user elects to accept the notification, then at block B212 the user communicates with the visitor through the user's client device 114 while being provided audio and/or video data captured by the camera 134, the microphone 158, and/or other sensors. At the end of the call, the user may terminate the connection between the user's client device 114 and the doorbell 130 and the session ends at block B216. In some embodiments, the audio and/or video data may be recorded and stored at a cloud server even if the user accepts the notification and communicates with the visitor through the user's client device 114.

Figure 14:
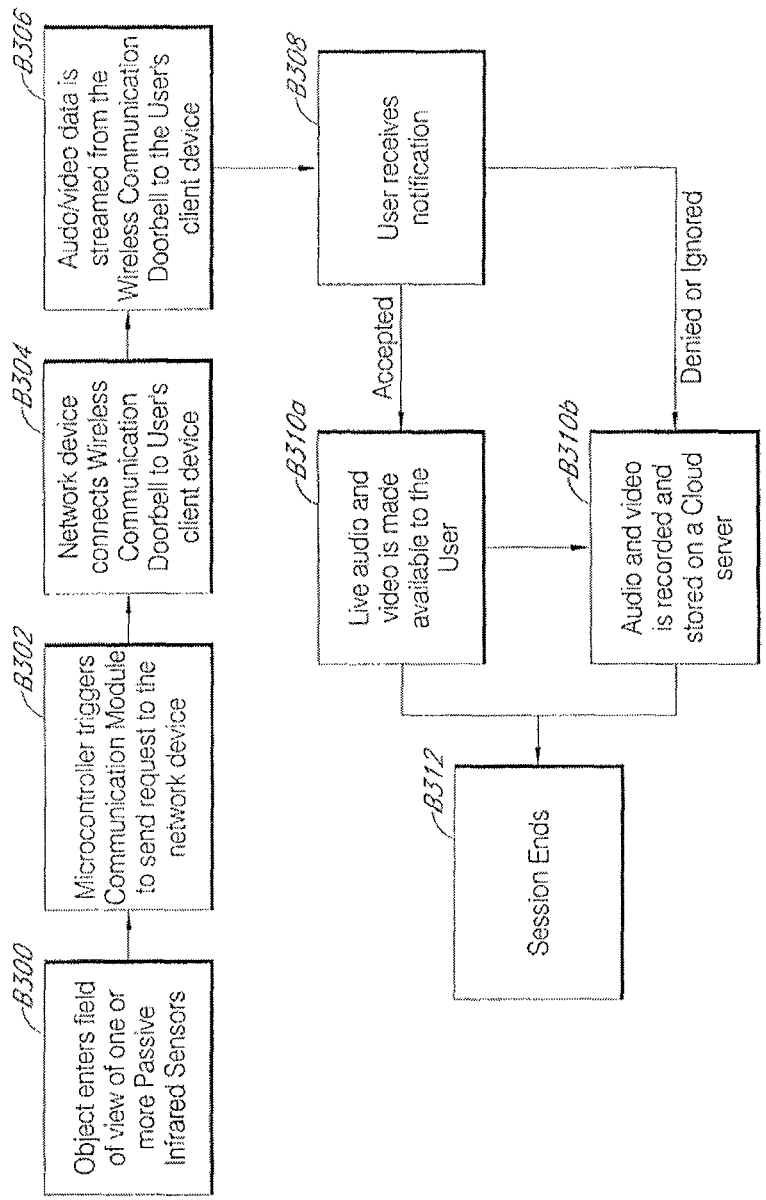
FIG. 14 is a flowchart illustrating another process for an A/V recording and communication doorbell according to an aspect of the present disclosure.

FIG. 14 is a flowchart illustrating another embodiment of a process according to an aspect of the present disclosure. At block B300, an object may move into the field of view of one or more of the PIR sensors 144. At block B302, the PIR sensors 144 may trigger the microcontroller 163, which may then trigger the communication module 164 to send a request to a network device. At block B304, the network device may connect the doorbell 130 to the user's client device 114 through the user's network 110 and the network 112. At block B306, the doorbell 130 may record available audio and/or video data using the camera 134, the microphone 158, and/or any other available sensor, and stream the data to the user's client device 114. At block B308, the user may receive a notification prompting the user to either accept or deny the notification. If the notification is accepted, then at block B310a the live audio/video data may be displayed on the user's client device 114, thereby allowing the user surveillance from the perspective of the doorbell 130. When the user is satisfied with this function, the user may sever the connection at block B312, whereby the session ends. If, however, at block B308 the user denies the notification, or ignores the notification and a specified time interval elapses, then the connection between the doorbell 130 and the user's client device 114 is terminated and the audio/video data is recorded and stored at a cloud server at block B310b, such that the user may view the audio/video data later at their convenience. The doorbell 130 may be configured to record for a specified period of time in the event the notification in block B308 is denied or ignored. If such a time period is set, the doorbell 130 may record data for that period of time before ceasing operation at block B312 thereby ending the session.

Figure 15:
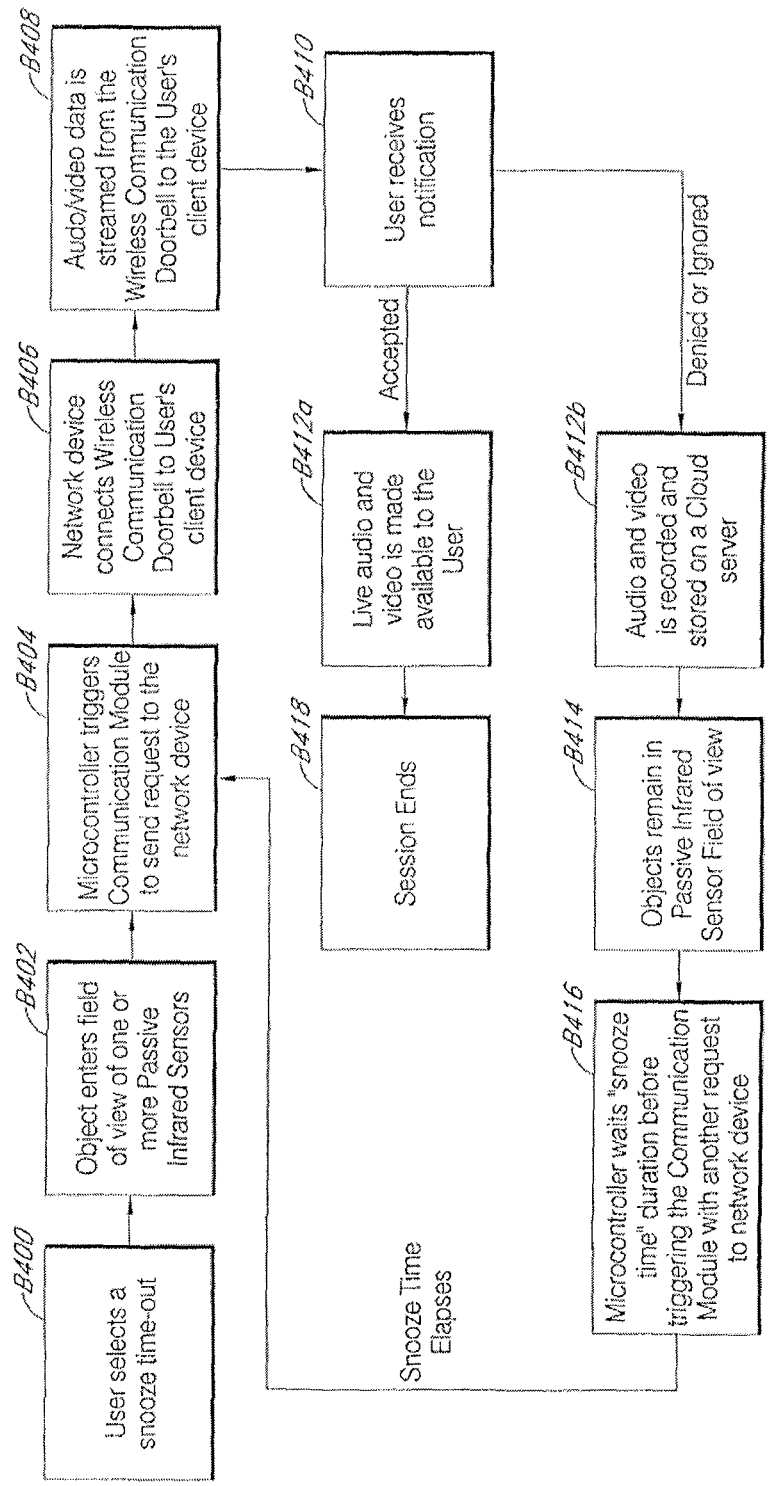
FIG. 15 is a flowchart illustrating another process for an A/V recording and communication doorbell according to an aspect of the present disclosure.

FIG. 15 is a flowchart illustrating another embodiment of a process according to an aspect of the present disclosure. At block B400, the user may select a "snooze time-out," which is a time period during which the doorbell 130 may deactivate or otherwise not respond to stimuli (such as light, sound, or heat signatures) after an operation is performed, e.g. a notification is either accepted or denied/ignored. For example, the user may set a snooze time-out of 15 minutes. At block B402, an object moves into the field of view of one or more of the PIR sensors 144. At block B404, the microcontroller 163 may trigger the communication module 164 to send a request to a network device. In block B406, the network device may connect the doorbell 130 to the user's client device 114 through the user's network 110 and the network 112. At block B408, audio/video data captured by the doorbell 130 may be streamed to the user's client device 114. At block B410, the user may receive a notification prompting the user to either accept or deny ignore the request, if the request is denied or ignored, then at block B412b audio/video data may be recorded and stored at a cloud server. After the doorbell 130 finishes recording, the objects may remain in the PIR sensor 144 field of view at block B414. In block B416, the microcontroller 163 waits for the "snooze time" to elapse, e.g., 15 minutes, before triggering the communication module 164 to submit another request to the network device. After the snooze time, e.g. 15 minutes, elapses, the process moves back to block B404 and progresses as described above. The cycle may continue like this until the user accepts the notification request at block B410. The process then moves to block B412a, where live audio and/or video data is displayed on the user's client device 114, thereby allowing the user surveillance from the perspective of the doorbell 130. At the user's request, the connection may be severed and the session ends at block B418. At this point the user may elect for the process to revert back to block B416, whereby there may be no further response until the snooze time, e.g. 15 minutes, has elapsed from the end of the previous session, or the user may elect for the process to return to block B402 and receive a notification the next time an object is perceived by one or more of the PIR sensors 144.

Continual Information Sampling at Regular Intervals

As described above, the present embodiments leverage the capabilities of audio/video (A/V) recording and communication devices, thereby providing enhanced functionality to such devices to reduce crime and increase public safety. One aspect of the present embodiments includes the realization that some methods for detecting motion with an A/V recording and communication device include undesirable latency. For example, in some methods a processor may not sample or analyze any information from motion sensors until it receives an interrupt. The processor then must gather at least a threshold number of information samples, which requires waiting at least a threshold number of sampling intervals, in order to gather enough information to confirm (or disconfirm) that motion is indicated. The time spent sampling information from the motion sensors after the interrupt thus creates latency. As further described below, processes according to the present embodiments solve this latency problem by enabling the processor to continually sample information from the motion sensors at regular intervals. Thus, in some embodiments, as soon as the sampled information indicates motion, the processor may immediately signal other components of the A/V recording and communication device to power up, thus eliminating the latency problem described above.

Figure 16:
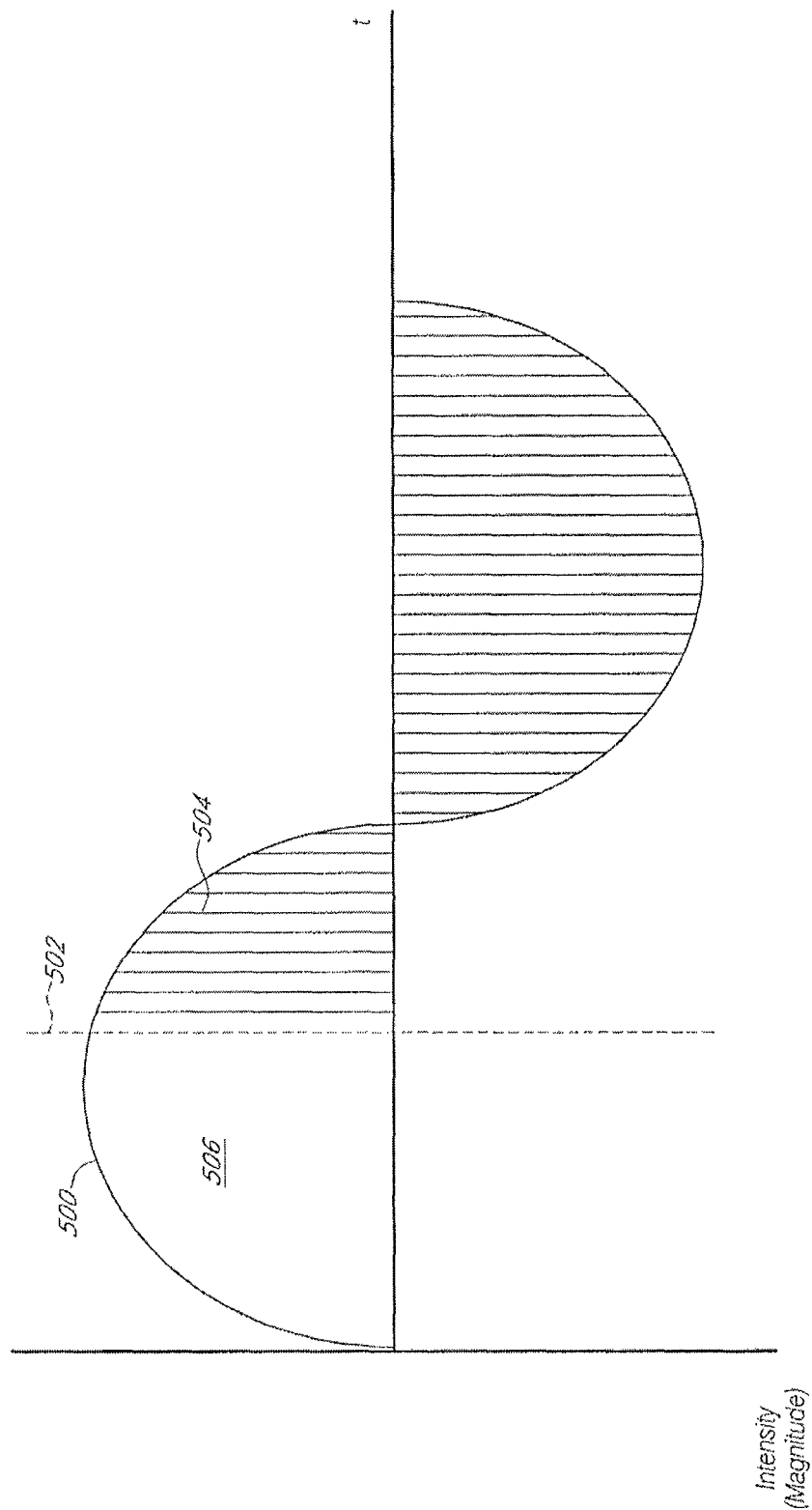
FIG. 16 is a graph illustrating a process for an A/V recording and communication device according to the present embodiments.
Figure 17:
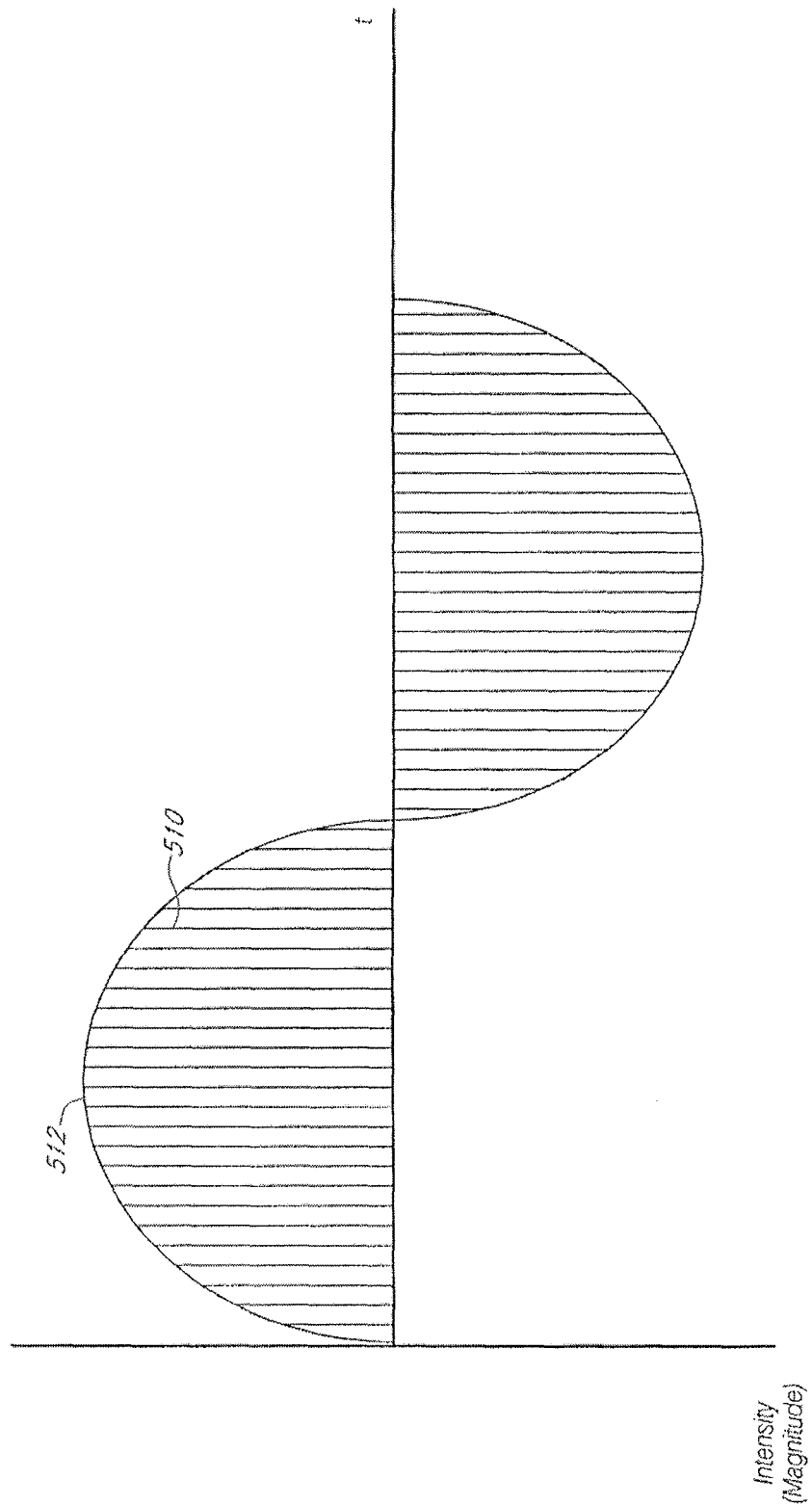
FIG. 17 is a graph illustrating another process for an A/V recording and communication device according to the present embodiments.

FIGS. 16 and 17 are graphs illustrating two processes for detecting motion with an A/V recording and communication device, according to the present embodiments. With reference to FIG. 16, the curve 500 represents the output signal from the PIR sensors 144. The curve 500 is plotted on horizontal and vertical axes representing time and intensity (or magnitude), respectively. For simplicity and clarity, only one curve 500 is illustrated in FIG. 16, even though each of the three PIR sensors 144 may produce a separate output signal.

As long as the PIR sensors 144 are powered on, they continually gather information from the field of view of the doorbell 130. For the PIR sensors 144, gathering information may comprise receiving IR radiation from one or more objects in the field of view of the doorbell 130. However, in some embodiments the doorbell 130 is configured to conserve power during periods of little or no activity in the vicinity of the doorbell 130. Thus, many, if not most or substantially all, of the components of the doorbell 130 may be in a low-power state (may also be referred to as a sleep state or a hibernation state) during periods of little or no activity in the field of view of the doorbell 130. For example, the microcontroller 143 (FIG. 12) may be in a low-power state until "woken up" by the PIR sensors 144. When the PIR sensors 144 detect motion (or possible motion) in the field of view of the doorbell 130, the PIR sensors 144 generate an interrupt 502 for the microcontroller 163, represented by the vertical dashed line in FIG. 16. In response to the interrupt 502, the microcontroller 163 powers up to an active state and commences sampling information from the PIR sensors 144 at regularly spaced sampling intervals 504, as represented by the vertical solid lines under the curve in FIG. 16. The sampling intervals 504 may have any time spacing, but in one example embodiment the micro/controller 143 may sample the information from the PIR sensors 144 at 64 Hz (one sample every 15.625 ms).

The microcontroller 163 analyzes the information in each sample, and continues sampling and analyzing the information from the PIR sensors 144 until enough information has been sampled and analyzed for the microcontroller 163 to determine whether there is actually motion in the field of view of the doorbell 130. In some embodiments, a number of sampling intervals 504 may be a preset number, or may be whatever number of samples is needed to make a positive determination that there is motion within the field of view of the doorbell 130. If the sampled information indicates motion, then the microcontroller 163 generates a signal to power up other components of the doorbell 130. For example, at least one of the communication module 164 (FIG. 12), the camera processor 170, and the imager 171 may power up in response to the signal from the microcontroller 163. The doorbell 130 may then begin streaming video and/or audio content to the user's client device 114, in accordance with the streaming process described above. If, however, the sampled information does not indicate motion, then the processor may revert to the low-power state until it receives another interrupt 502 from the PIR sensors 144.

In the process described above with reference to FIG. 14, the microcontroller 163 does not sample or analyze any information from the PIR sensors 144 until it receives the interrupt 502, as indicated by the blank area 504 under the curve 500 to the left of the dashed vertical line 502. The process of FIG. 16 thus includes undesirable latency. The process illustrated in FIGS. 17 and 18 solves this latency problem by enabling the microcontroller 163 to continually sample information from the PIR sensors 144 at regular intervals.

With reference to FIG. 17, the microcontroller 163 continually samples information from the PIR sensors 144 at regular sampling intervals 510, as represented by the vertical solid lines under the curve 512 in FIG. 17. Between sampling intervals 510, the microcontroller 163 is in the low-power state, as represented by the spaces between the vertical solid lines 510 under the curve 512 in FIG. 17. At each sampling interval 510, the microcontroller 163 powers up to the active state, analyzes the information in the sample, and then immediately reverts to the low-power state until the next sampling interval 510, unless a threshold number of consecutive samples and respective magnitudes indicate that motion is happening in the field of view of the doorbell 130. If a threshold number of consecutive samples and respective magnitudes indicate that motion is happening in the field of view of the doorbell 130, then the microcontroller 163 generates a signal to power up other components of the doorbell 130, such as at least one of the communication module 164 (FIG. 12), the camera processor 170, and the imager 171. In some embodiments, the threshold number of consecutive samples may be a preset number, or may be whatever number of samples is needed to make a positive determination that there motion within the field of view of the doorbell 130.

Figure 18:
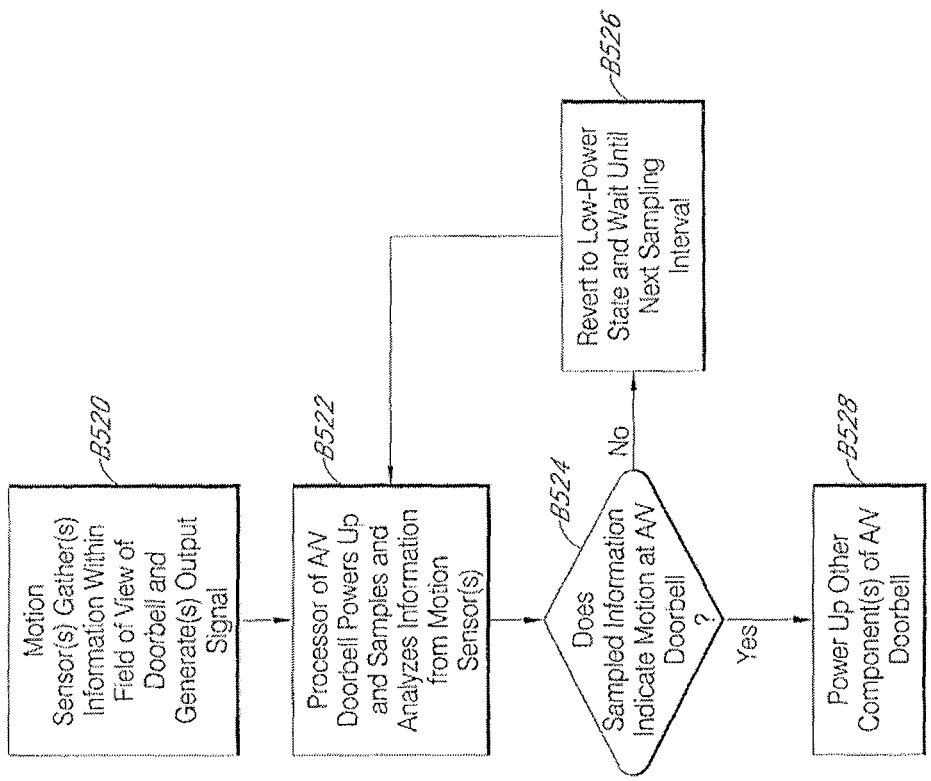
FIG. 18 is a flowchart illustrating another process for an A/V recording and communication device according to an aspect of the present disclosure.

FIG. 18 illustrates the foregoing process in further detail. At block B520, the PIR sensors 144 gather information from the area in the field of view of the doorbell 130 and generate an output signal 512 (FIG. 17). Then, at block B522, at a sampling interval 510 (FIG. 17), the microcontroller 163 powers up to the active state, and samples and analyzes the information from the PIR sensors 144. The process then moves to block B524, where the microcontroller 163 determines whether the sampled information indicates motion in the field of view of the doorbell 130. If not, then the process moves to block B526, where the microcontroller 163 reverts to the low-power state and waits until the next sampling interval, at which time the process returns to block B522 and repeats blocks B522 and B524. If, however, the microcontroller 163 determines at block B524 that the sampled information indicates motion in the field of view of the doorbell 130, then the process moves to block B528, where the microcontroller 163 generates a signal to power up other components of the doorbell 130. While not shown in FIG. 18, after block B528 the doorbell 130 streams audio and/or video content to the users client device 114.

In certain embodiments, the determination at block B524 (whether the sampled information indicates motion in the field of view of the doorbell 130) is based on sampling and analysis of a threshold number of samples, where the threshold number is an integer greater than 1. Thus, the process of FIG. 18 may loop through blocks B522-B526 until the threshold number of samples is reached, after which the process moves to block B528, unless no motion is indicated by the threshold number of samples, in which case the process will continue to loop through blocks B522-

B526. The threshold number of samples is discussed in further detail below with reference to FIG. 28.

The process of FIGS. 17 and 18 advantageously decreases latency compared to the process of FIG. 16. In the process of FIG. 16, the microcontroller 163 doesn't begin to sample information from the PIR sensors 144 until it receives an interrupt. The microcontroller 163 then must gather at least a threshold number of information samples, which requires waiting at least a threshold number of sampling intervals, in order to gather enough information to confirm (or disconfirm) that motion is indicated in the field of view of the doorbell 130. The time spent sampling information from the PIR sensors 144 thus creates latency. By contrast, in the process of FIGS. 17 and 18 the microcontroller 163 is continually sampling information from the PIR sensors 144 at regular intervals. Thus, as soon as the sampled information indicates motion, the microcontroller 163 immediately signals the other components of the doorbell 130 to power up, thus eliminating the latency of the process of FIG. 16.

The process of FIGS. 17 and 18 does not create a severe power drain on the battery 166, at least in part because the microcontroller 163 is in the low-power state between sampling intervals. Further, the process of FIGS. 17 and 18 may be executed with a microcontroller 163 having a relatively slow processor clock, for example 4 MHz. The relatively slow processor clock enables the microcontroller 163 to consume relatively little power, so that the battery 166 does not drain too quickly.

Filters

Another aspect of the present embodiments includes the realization that a motion sensor will generally detect a vehicle passing through its field of view, but a user will generally not want to be bothered by alerts generated in response to vehicles. As further described below, processes according to the present embodiments solve this problem by filtering out motion of vehicles in order to reduce false positive signals. Another aspect of the present embodiments includes the realization that false positive signals are sometimes generated by direct sunlight impinging on motion sensors, such as PIR sensors, and/or by rapid temperature changes within the A/V recording and communication device. As further described below, processes according to the present embodiments solve this problem by filtering out these stimuli in order to reduce false positive signals.

Vehicle Filter

Figure 19:
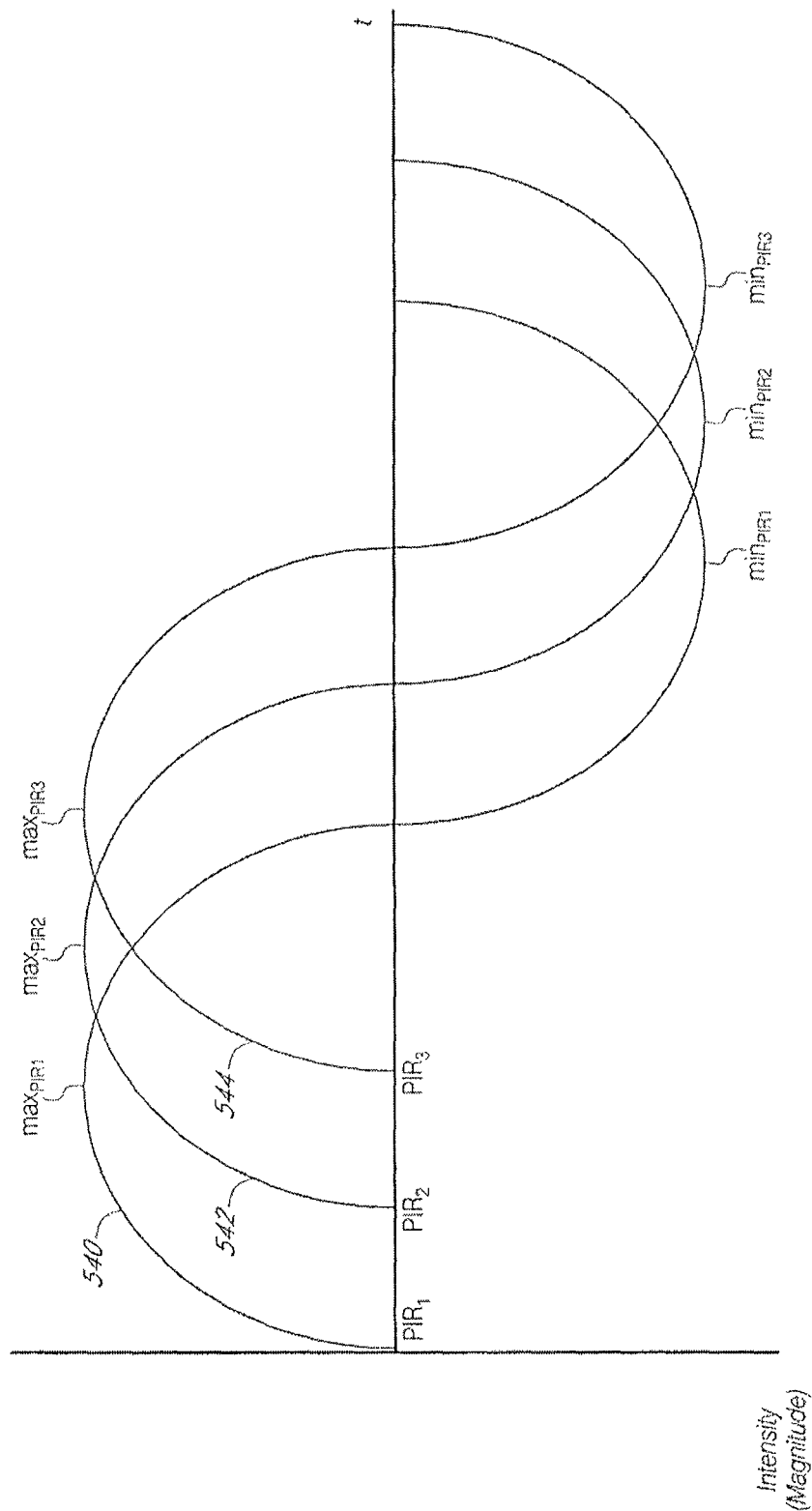
FIG. 19 is a graph illustrating another process for an A/V recording and communication device according to the present embodiments.
Figure 20:
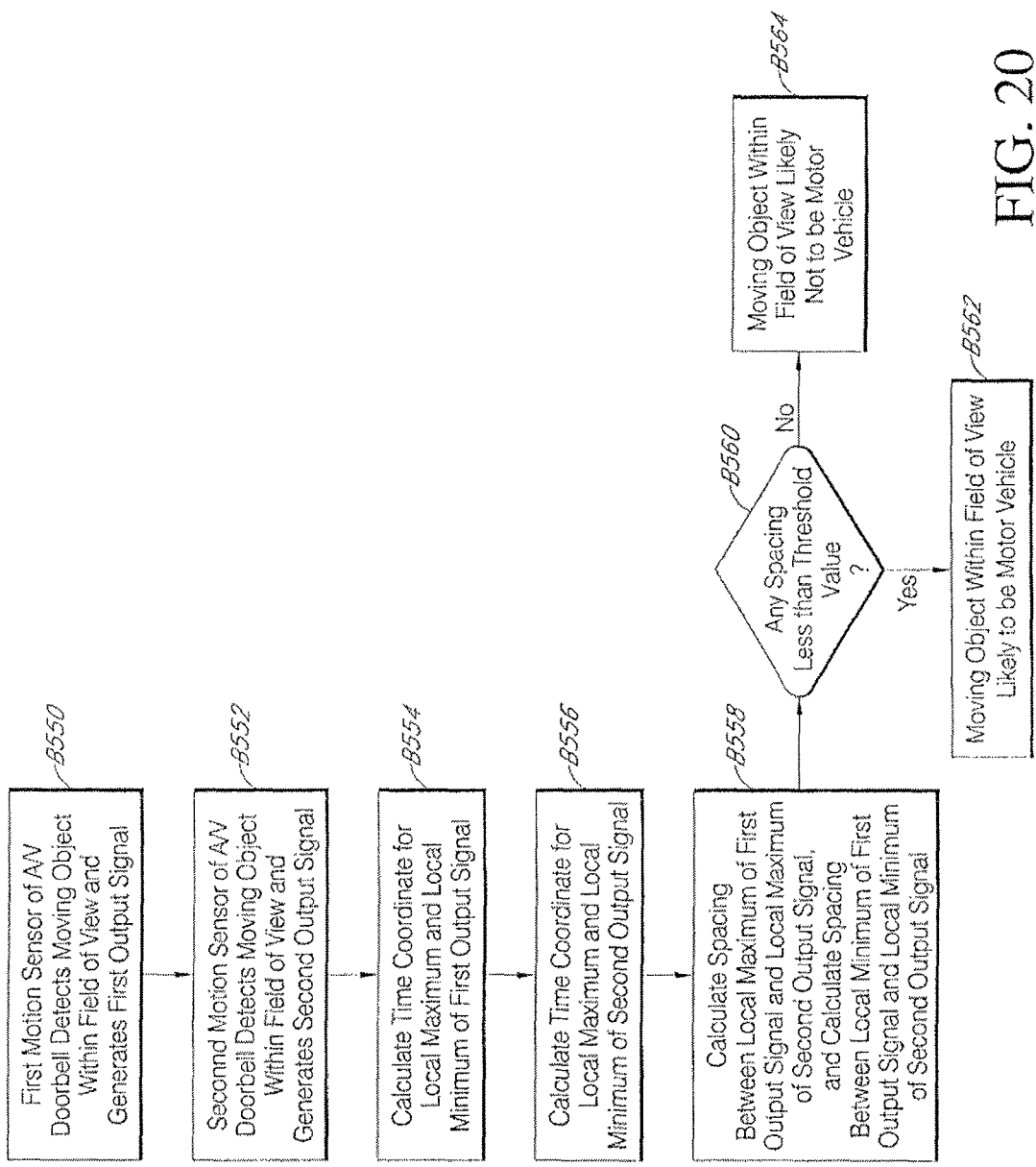
FIG. 20 is a flowchart illustrating another process for an A/V recording and communication device according to an aspect of the present disclosure.

FIGS. 19 and 20 illustrate a process for filtering out motion of vehicles, according to the present embodiments. With reference to FIG. 19, three curves 540, 542, 544 represent the output signals from the three PIR sensors 144, respectively labeled $PIR_1$, $PIR_2$, and $PIR_3$. With reference to FIG. 11, as an object moves across the field of view of the doorbell 130 (from left to right or right to left), it passes through, consecutively, the fields of view of the individual PIR sensors 144-1, 144-2, 144-3. Thus, the discrete output signals $PIR_1$, $PIR_2$, $PIR_3$ generated by each of the PIR sensors 144-1, 144-2, 144-3 are spaced from one another along the x-axis in FIG. 19. If the object is moving quickly across the field of view of the doorbell 130, the output signals $PIR_1$, $PIR_2$, $PIR_3$ will be closely spaced along the x-axis. Conversely, if the object is moving slowly across the field of view of the doorbell 130, the output signals $PIR_1$, $PIR_2$, $PIR_3$ will be spaced far apart along the x-axis. Since vehicles generally move faster than people, vehicles can be filtered out by comparing the spacing of the output signals $PIR_1$, $PIR_2$, $PIR_3$ with a threshold value and, if the spacing is less than the threshold value, it can be assumed that the motion indicates a vehicle.

One advantageous way to measure the spacing between the output signals $PIR_1$, $PIR_2$, $PIR_3$ is to calculate local maxima and minima for each of the curves 540, 542, 544, and to calculate the spacing between the local maxima and minima. For example, with continued reference to FIG. 19, the first output signal $PIR_1$ includes a local maximum $\max_{PIR1}$ and a local minimum $\min_{PIR1}$. Likewise, the second output signal $PIR_2$ includes a local maximum $\max_{PIR2}$ and a local minimum $\min_{PIR2}$, and the third output signal $PIR_3$ includes a local maximum $\max_{PIR3}$ and a local minimum $\min_{PIR3}$. After calculating the locations of each of $\max_{PIR1}$, $\max_{PIR2}$, $\max_{PIR3}$, $\min_{PIR1}$, $\min_{PIR2}$, and $\min_{PIR3}$, the spacing between each pair of local maxima and each pair of local minima is calculated by subtracting the time coordinates of each pair ($\max_{PIR2}-\max_{PIR1}$, $\max_{PIR3}-\max_{PIR2}$, $\max_{PIR3}-\max_{PIR1}$; $\min_{PIR2}-\min_{PIR1}$, $\min_{PIR3}-\min_{PIR2}$, $\min_{PIR3}-\min_{PIR1}$). The result of each subtraction operation is then compared with a threshold value, if any of the results of the subtraction operations is less than the threshold value, it is likely that the motion indicates a vehicle, because faster moving objects cause the PIP, sensors 144 to generate output signals that are closer to one another in time. Output signals from the PIR sensors 144 that are likely to have been caused by a vehicle can be filtered out (ignored) for purposes of determining when to send an alert signal to the user's client device 114. The present process thus advantageously results in fewer alert signals by filtering out those motions that are generated by vehicles, because the user is not likely to be interested in being notified about these types of motions.

FIG. 20 illustrates the foregoing process in further detail. At block B550, a first one of the PIR sensors 144 detects a moving object within its field of view and generates a first output signal. The first one of the PIR sensors 144 to generate the first output signal may be any of the PIR sensors 144-1, 144-2, 144-3, depending upon the location and/or direction of movement of the object. Then, at block B552, a second one of the PIR sensors 144 detects the moving object within its field of view and generates a second output signal. Again, the second one of the PIR sensors 144 to generate the second output signal may be any of the PIR sensors 144-1, 144-2, 144-3, depending upon the location and/or direction of movement of the object.

At block B554, the time coordinates for a local maximum and a local minimum of the first output signal are calculated, and at block B556 the time coordinates for a local maximum and a local minimum of the second output signal are calculated. At block B558, the spacing between the local maximum of the first output signal and the local maximum of the second output signal is calculated, and the spacing between the local minimum of the first output signal and the local minimum of the second output signal is calculated. At block B560, the spacings calculated at block B558 are compared with a threshold value, if any of the spacings is less than the threshold value, then at block B562 it is determined that the moving object is likely to be a motor vehicle. If, however, none of the spacings is less than the threshold value, then at block B564 it is determined that the moving object is likely not to be a motor vehicle. At any of blocks B554-B564, the microcontroller 163 may perform any or all of the steps of calculating, comparing, and/or determining.

The foregoing process advantageously filters out signals from the PIR sensors 144 that are likely to have been caused by a vehicle. This process thus advantageously results in fewer alert signals being sent to the user, thereby reducing the frequency of false positive alerts.

In another embodiment of a process for filtering out motion of vehicles, the magnitude of the output signal from one or more of the PIR sensors 144 may be compared to a threshold value to determine if the output signal is likely to be indicative of a motor vehicle. As described above, motor vehicles generally move more quickly than pedestrians, and faster moving objects generally produce output signals of greater magnitude from motion sensors, as compared to slower moving objects. Thus, if the magnitude of a given output signal from one or more of the PIR sensors 144 is greater than the threshold value, it can be determined that the moving object is likely to be a motor vehicle. Such output signals can be filtered out to reduce the number of false positive alerts to the user's client device 114.

In certain embodiments, the magnitude of the output signal from one or more of the PIR sensors 144 may be used as a check on the process of FIG. 20, and vice versa. For example, if it is determined that any of the spacings between local maxima and minima is less than a threshold value, which is indicative of vehicle motion, then it may also be determined whether the magnitude of the output signal from the PIR sensors 144 is greater than a threshold value, which it should be if the PIR sensors 144 are in fact detecting vehicle motion. Conversely, if it is determined that the magnitude of the output signal from the PIR sensors 144 is greater than a threshold value, which is indicative of vehicle motion, then it may also be determined whether any of the spacings between local maxima and minima is less than a threshold value, which it should be if the PIR sensors 144 are in fact detecting vehicle motion. If, in either case, the determinations (spacings vs. magnitude of output signal) contradict one another, the process may loop back and repeat one or more steps before making a final determination whether the PIR sensors 144 are detecting vehicle motion.

Sunlight Filter

Figure 21:
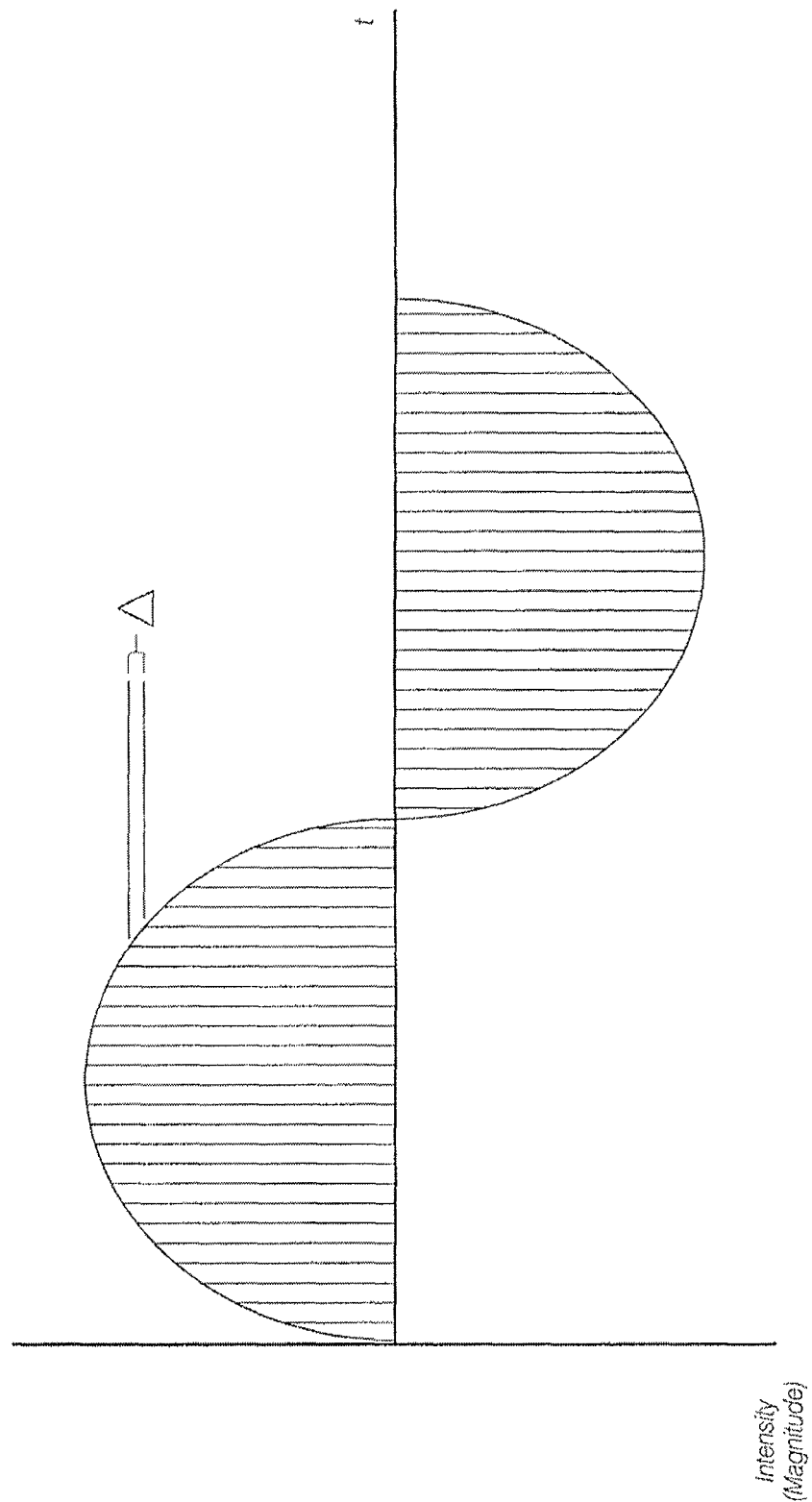
FIG. 21 is a graph illustrating another process for an A/V recording and communication device according to the present embodiments.
Figure 22:
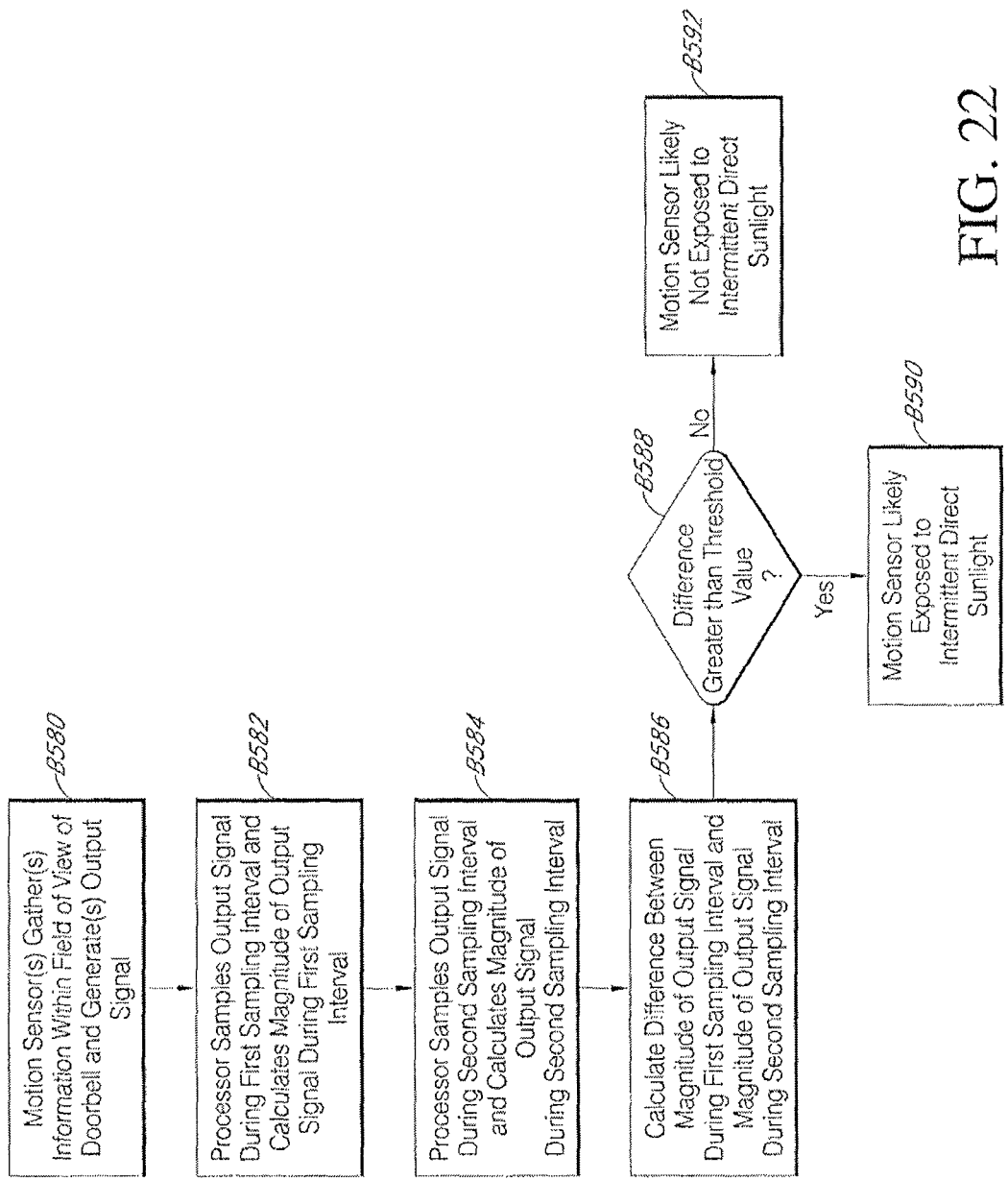
FIG. 22 is a flowchart illustrating another process for an A/V recording and communication device according to an aspect of the present disclosure.

FIGS. 21 and 22 illustrate a process for reducing false positive signals that might be generated by direct sunlight impinging on the PIR sensors 144, according to the present embodiments. Direct sunlight impinging on the PIR sensors 144 can generate a false positive detection of movement, because the PIR sensors 144 are sensitive to heat signatures of objects, and the radiative heat of direct sunlight can be falsely interpreted by the PIR sensors 144 to be an object within the field of view of the PIR sensors 144. This effect of sunlight on the PIR sensors 144 can be especially problematic when the sunlight falling on the PIR sensors 144 is intermittent, as can happen when the PIR sensors 144 are in the shade of a tree or another type of object that tends to sway in the wind. The present embodiments are configured to filter out these types of false positives.

With reference to FIG. 21, one embodiment of a sunlight filter uses the rate of change of the output signal from the PIR sensors 144 to determine whether it is likely that the output signal is result of direct sunlight falling on the PIR sensors 144. Direct sunlight falling on the PIR sensors 144 tends to produce output signals that change rapidly, especially when the sunlight falling on the PIR sensors 144 is intermittent, because of the rapid changes in temperature that can occur when the PIR sensors 144 are alternately receiving direct sun and shade. Thus, the present embodiment calculates the rate of change (represented by "Δ" in FIG. 21) of the output signal 570 from the PIR, sensors 144 by calculating the difference in the magnitude of the output signal 570 at a first sampling interval 572 and at a second sampling interval 574. The calculated rate of change is then compared to a threshold value, and if the rate of change is greater than the threshold value, it is determined that the signal is likely caused by intermittent direct sunlight.

In FIG. 21, the first and second sampling intervals 572, 574 are illustrated as being consecutive, but in certain embodiments they may not be consecutive. Further, for simplicity and clarity, only one output signal 570 is shown in FIG. 21, even though each of the three PIR sensors 144 may produce a separate output signal.

FIG. 22 illustrates the foregoing process in further detail. At block B580, the PIR sensors 144 gather information from the area in the field of view of the doorbell 130 and generate an output signal 570 (FIG. 21). Then, at block B582, at a first sampling interval 572 (FIG. 21), the microcontroller 163 samples and analyzes the information from the PIR sensors 144 and calculates the magnitude of the output signal 570 during the first sampling interval 572. Then, at block B584, at a second sampling interval 574 (FIG. 21), the microcontroller 163 samples and analyzes the information from the PIR sensors 144 and calculates the magnitude of the output signal 570 during the second sampling interval 574. At block B586, microcontroller 163 calculates the difference between the magnitudes of the output signal 570 during the first and second sampling intervals 572, 574. At block B588, the difference calculated at block B586 is compared with a threshold value. If the difference is greater than the threshold value, then at block B590 it is determined that the PIR sensors 144 are likely exposed to intermittent direct sunlight. If, however, the difference is not greater than the threshold value, then at block B592 it is determined that the PIR sensors 144 are likely not exposed to intermittent direct sunlight.

The foregoing process advantageously filters out signal from the PIR sensors 144 that are likely to have been caused by intermittent direct sunlight. This process thus advantageously results in fewer alert signals being sent to the user, thereby reducing the frequency of false positive alerts.

Figure 23:
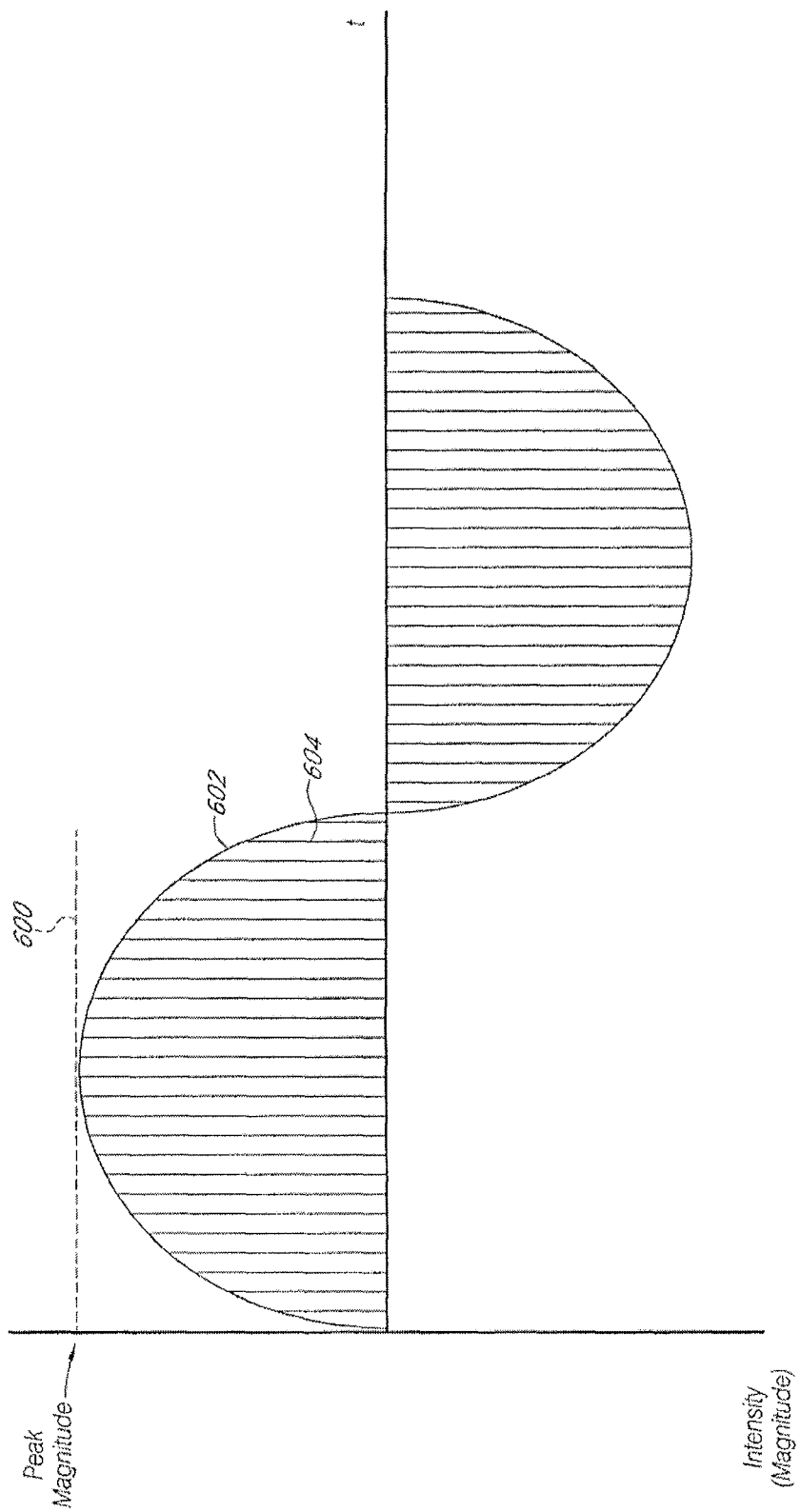
FIG. 23 is a graph illustrating another process for an A/V recording and communication device according to the present embodiments.

With reference to FIG. 23, another embodiment of a sunlight filter uses the peak magnitude 600 of the output signal 602 from the PIR sensors 144 to determine whether it is likely that the output signal 602 is the result of direct sunlight falling on the PIR sensors 144. Direct sunlight falling on the PIR sensors 144 tends to produce output signals having large magnitudes, especially when the sunlight falling on the PIR sensors 144 is intermittent, because of the rapid changes in temperature that can occur when the PIR sensors 144 are alternately receiving direct sun and shade. Thus, in the present embodiment the microcontroller 163 samples the output signal 602 over multiple sampling intervals 504 and calculates the peak magnitude 600 of the output signal 602 during those sampling intervals 404. The calculated peak magnitude 600 is then compared to a threshold value, and if the peak magnitude 400 is greater than the threshold value, it is determined that the signal is likely caused by intermittent direct sunlight. In FIG. 23, for simplicity and clarity, only one output signal 602 is shown, even though each of the three PIR sensors 144 may produce a separate output signal.

Figure 24:
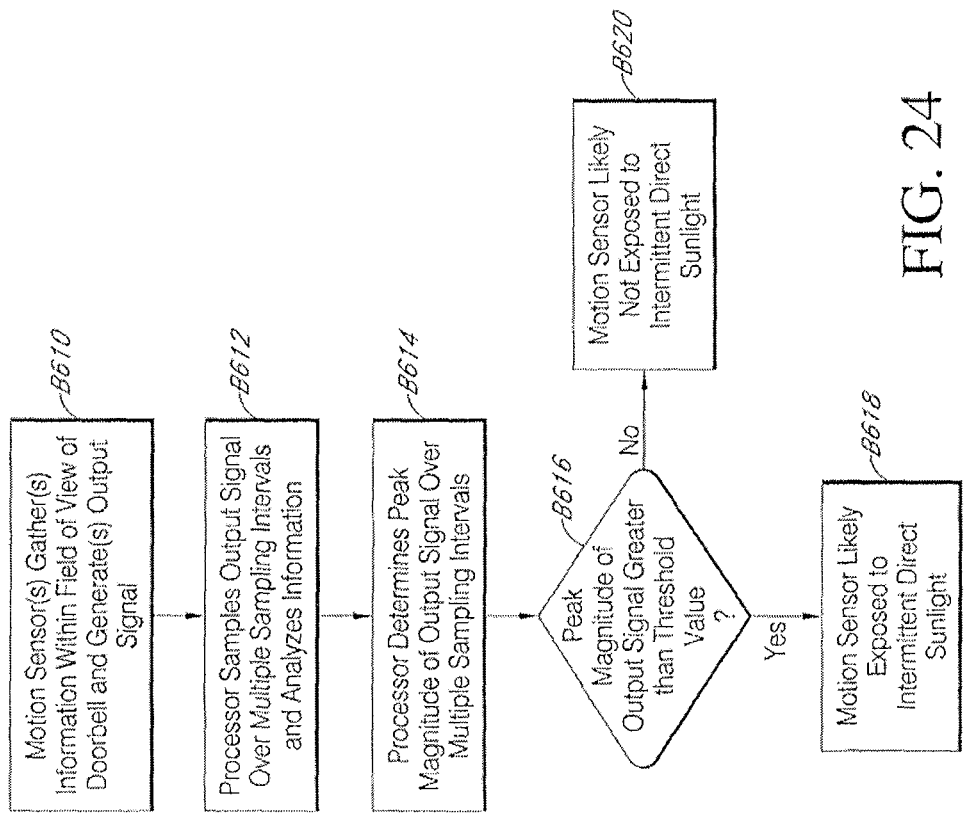
FIG. 24 is a flowchart illustrating another process for an A/V recording and coma device according to an aspect of the present disclosure.

FIG. 24 illustrates the foregoing process in further detail. At block B610, the PIR sensors 144 gather information from the area in the field of view of the doorbell 130 and generate an output signal 602 (FIG. 23). Then, at block B612, the microcontroller 163 samples the output signal 402 over multiple sampling intervals 604 and analyzes the information in the output signal 602 at each sampling interval 504. Then, at block B614, the microcontroller 163 determines the peak magnitude 600 of the output signal 602 over the multiple sampling intervals 604. At block B616, the peak magnitude 600 of the output signal 602 is compared with a threshold value. If the peak magnitude 600 is greater than the threshold value, then at block B618 it is determined that the PIR sensors 144 are likely exposed to intermittent direct sunlight. If, however, the peak magnitude 600 is not greater than the threshold value, then at block B620 it is determined that the PIR sensors 144 are likely not exposed to intermittent direct sunlight.

The foregoing process advantageously filters out signals from the PIR sensors 144 that are likely to have been caused by intermittent direct sunlight. This process thus advantageously results in fewer alert signals being sent to the user, thereby reducing the frequency of false positive alerts.

In certain embodiments, the processes of FIGS. 22 and 24 may be combined in order to increase the accuracy of the determination of whether the PIR sensors 144 are exposed to intermittent direct sunlight. For example, if it is determined that the rate of change of the output signal from the PIR sensors 144 is greater than a threshold value, which is indicative of the PIR sensors 144 being exposed to intermittent direct sunlight, then it may also be determined whether the magnitude of the output signal from the PIR sensors 144 is also greater than a threshold value, which it should be if the PIR sensors 144 are in that exposed to intermittent direct sunlight. Conversely, if it is determined that the magnitude of the output signal from the PIR sensors 144 is greater than a threshold value, which is indicative of the PIR sensors 144 being exposed to intermittent direct sunlight, then it may also be determined whether the rate of change of the output signal from the PIR sensors 144 is also greater than a threshold value, which it should be if the PIR sensors 144 are in fact exposed to intermittent direct sunlight. If, in either case, the determinations (rate of change of output signal vs. magnitude of output signal) contradict one another, the process may loop back and repeat one or more steps before making a final determination whether the PIR sensors 144 are exposed to intermittent direct sunlight.

Temperature Filter

Figure 25:
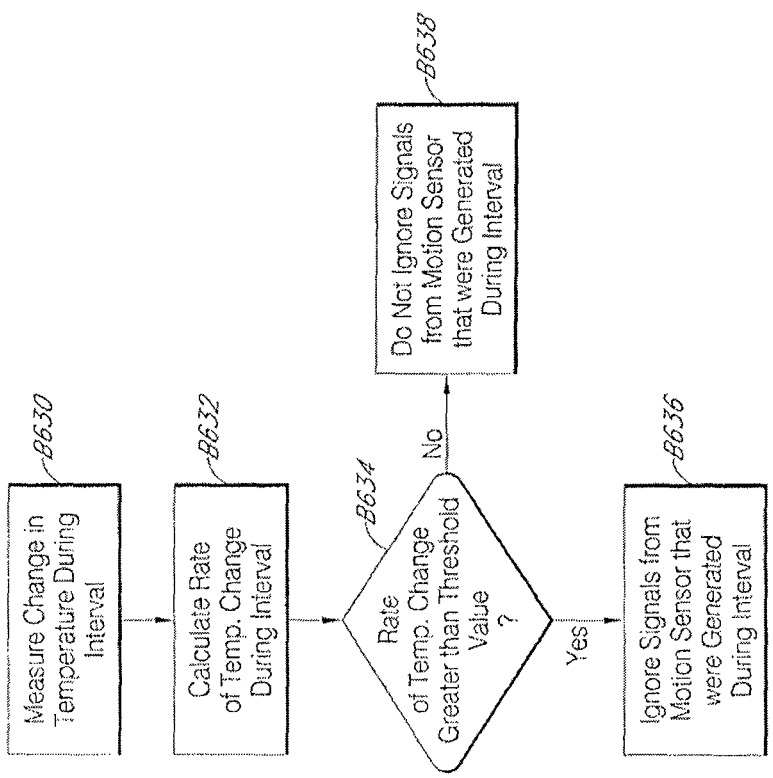
FIG. 25 is a flowchart illustrating another process for an A/V recording and communication device according to an aspect of the present disclosure.

FIG. 25 illustrates a process for reducing false positive signals that might be generated by rapid temperature changes within the doorbell 130, according to the present embodiments. In cold climates, the temperature within the doorbell 130 may change rapidly when one or more components of the doorbell 130 transition from a low-power state to an active state, and/or when one or more components of the doorbell 130 transition from a powered-off state to a powered-on state. This effect results from the fact that many of the components of the doorbell 130 generate their own heat when they are in an active state or a powered-on state. The heat generated by these components can cause a rapid temperature change within the doorbell 130 when the doorbell 130 is located in a region where the ambient temperature is cold. Such a rapid temperature change can cause the PIR sensors 144 to become unstable, which can result in unpredictable signal outputs from the PIR sensors 144. The process of FIG. 25 filters out the signal outputs from the PIR sensors 144 that occur during periods of rapid temperature change within the doorbell 130, thereby advantageously reducing the frequency of false positive alerts.

With reference to FIG. 25, at block B630 a temperature change within and/or near the doorbell 130 during an interval is measured. The temperature change may be measured with rate or more temperature sensors, such as a temperature sensor (not shown) associated with the battery 166, and/or the temperature sensor 153 of the bracket PCB 149. Then, at block B632, the rate of temperature change during the measured interval is calculated. In some embodiments, the microcontroller 163 may calculate the rate of temperature change. Then, at block B634, the calculated rate of temperature change is compared with a threshold value. In some embodiments, the microcontroller 163 may make the comparison. In one non-limiting example, the threshold value used in the comparison may be 1° C./min. If the calculated rate of temperature change is greater than the threshold value, then at block B636, any output signals from the PIR sensors 144 that occurred during the measured interval are ignored because they are likely to be unreliable. If, however, the calculated rate of temperature change is not greater than the threshold value, then at block B638 any output signals from the PIR sensors 144 that occurred during the measured interval are not ignored.

The foregoing process advantageously filters out signals from the PIR sensors 144 that are likely to be unreliable because they occurred during periods of rapid temperature change within the doorbell 130 when the PIR sensors 144 may have been unstable. This process thus advantageously results in fewer alert signals being sent to the user, thereby reducing the frequency of false positive alerts.

Visitor Approaching vs. Visitor Departing

Another aspect of the present embodiments includes the realization that unwanted alert signals may be generated by an A/V recording and communication device, such as a doorbell, when a home occupant walks out the front door. As further described below, processes according to the present embodiments solve this problem by determining whether a moving object is moving toward or away from the doorbell (or other A/V recording and communication device), and generating alerts only in those instances when it is determined that the moving object is moving toward the doorbell, thereby reducing the frequency of unwanted alerts to the user.

Figure 26:
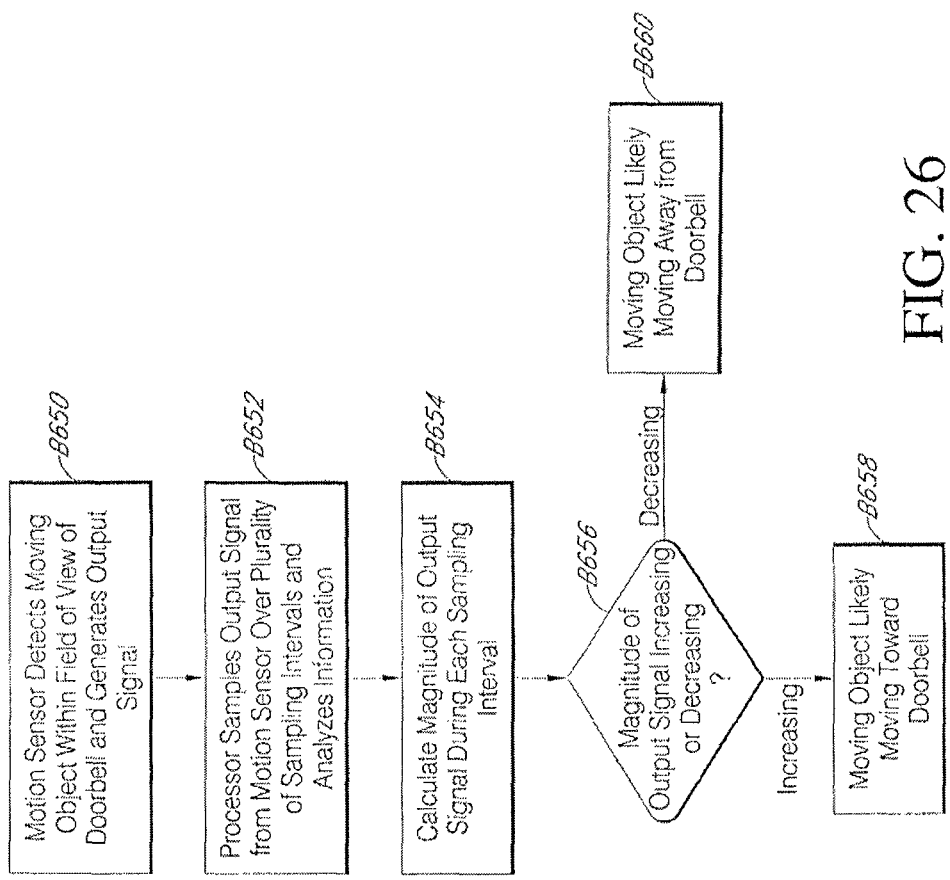
FIG. 26 is a flowchart illustrating another process for an A/V recording and communication device according to an aspect of the present disclosure.

FIG. 26 illustrates a process for determining whether a visitor within the field of view of the doorbell 130 is moving toward or away from the doorbell 130, according to the present embodiments. Generally, if a visitor is moving toward the doorbell 130, the magnitude of the output signal generated by the PIR sensors 144 increase as the visitor moves closer and closer to the doorbell 130. Conversely, if a visitor is moving away from the doorbell 130, the magnitude of the output signal generated by the sensors 144 will decrease as the visitor moves farther and farther away from the doorbell 130. Determining whether a visitor is moving toward or away from the doorbell 130 can reduce unwanted alert signals to the user. For example, a user may not want to receive an alert when a home occupant walks out the front door. Thus, if it can be determined that a moving object is moving away from the doorbell 130, then an alert may not be generated in those instances, thereby reducing the frequency of unwanted alerts to the user.

With reference to FIG. 26, at block B650, one or more of the PIR sensors 144 detects a moving object within the field of view of the doorbell 130 and generates an output signal. At block B652, the microcontroller 163 samples the output signal over a plurality of sampling intervals and analyzes the information in each of the samples. The number of sampling intervals may be a preset number, or may be whatever number of samples is needed to make a positive determination that there is motion within the field of view of the doorbell. At block B654, the microcontroller 163 calculates the magnitude of the output signal during each of the sampling intervals. Then, at block B656, the microcontroller 163 determines if the magnitude of the output signal is increasing or decreasing over the course of the sampling intervals. If the magnitude of the output signal is increasing, then, at block B658, the microcontroller 163 determines that the moving object is moving toward the doorbell 130. If, however, the magnitude of the output signal is decreasing, then, at block B660, the microcontroller 163 determines that the moving object is moving away from the doorbell 130. While not shown in FIG. 26, if it is determined that the moving object is moving away from the doorbell 130, in some embodiments the doorbell 130 may not generate an alert for the user.

Figure 27:
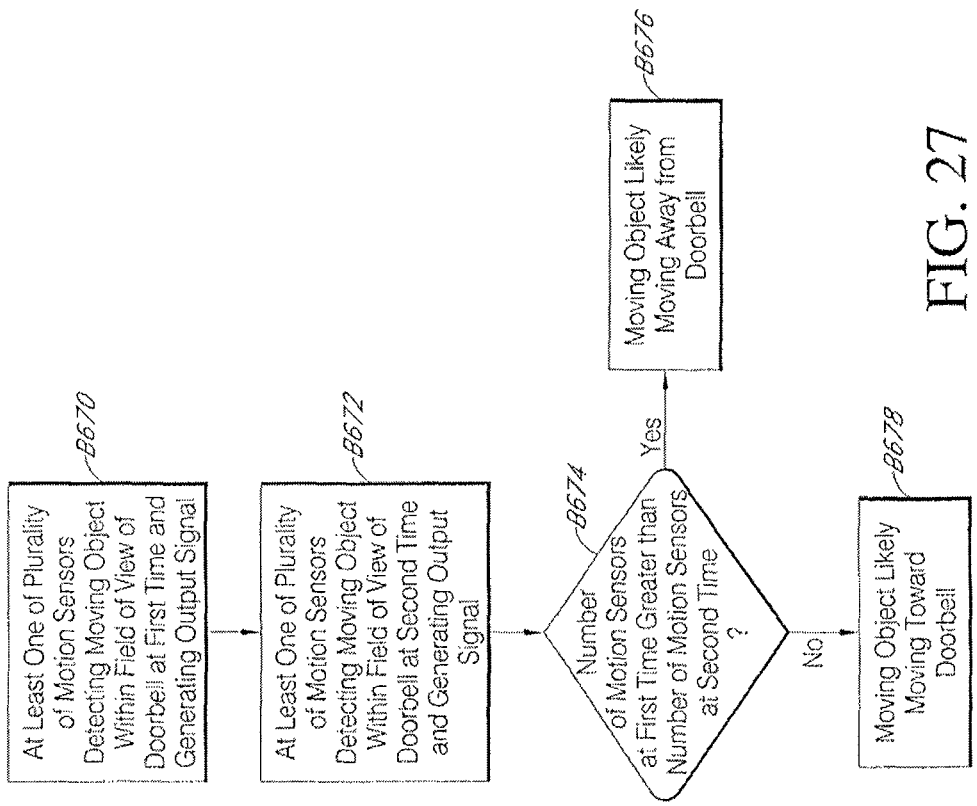
FIG. 27 is a flowchart illustrating another process for an A/V recording and communication device according to an aspect of the present disclosure.

FIG. 27 illustrates another process for determining whether a visitor within the field of view of the doorbell 130 is moving toward or away from the doorbell 130, according to the present embodiments. Generally, if a visitor is moving toward the doorbell 130, the number of the PIR sensors 144 that detect the visitor will increase over time as the visitor moves closer and closer to the doorbell 130. Conversely, if a visitor is moving away from the doorbell 130, the number of the PIR sensors 144 that detect the visitor will decrease over time as the visitor moves farther and farther away from the doorbell 130. For example, with reference to FIG. 11, a visitor approaching from just outside one of the Zones 1-5 will first be detected by just one of the PIR sensors 144-1, 144-2, 144-3, but by the time the visitor reaches the doorbell 130 he or she will be detected by all three of the PIR sensors 144-1, 144-2, 144-3. Conversely, if a visitor begins from a point very close to the doorbell 130 and moves away from the doorbell 130, he or she will first be detected by all three of the PIR sensors 144-1, 144-2, 144-1, and then by fewer and fewer of the PIR sensors 144-1, 144-2, 1443 as he or she moves farther and farther away. Determining whether a visitor is moving toward or away from the doorbell 130 can reduce unwanted alert signals to the user. For example, a user may not want to receive an alert when a home occupant walks out the front door. Thus, if it can be determined that a moving object is moving away from the doorbell 130, then an alert may not be generated in those instances, thereby reducing the frequency of unwanted alerts to the user.

With reference to FIG. 27, at block B670, at least one of the PIR sensors 144 detects, at a first time, a moving object within the field of view of the doorbell 130 and generates an output signal. At block B672, at least one of the PIR sensors 144 detects, at a second time, the moving object within the field of view of the doorbell 130, and generates an output signal. At block B674, the microcontroller 163 determines whether the number of PIR sensors 144 that detected the moving object at the first time is greater than or less than the number of PIR sensors 144 that detected the moving object at the second time. If the number of PIR sensors 144 that detected the moving object at to first time is greater than the number of PIR sensors 144 that detected the moving object at the second time, then, at block B676, the microcontroller 163 determines that the moving object is moving away from the doorbell 130. If, however, the number of PIR sensors 144 that detected the moving object at the first time is less than the number of PIR sensors 144 that detected the moving object at the second time, then, at block B678, the microcontroller 163 determines that the moving object is moving toward the doorbell 130. While not shown in FIG. 27, if it is determined that the moving object is moving away front the doorbell 130, in some embodiments the doorbell 130 may not generate an alert for the user.

In certain embodiments, the processes of FIGS. 26 and 27 may be combined in order to increase the accuracy of the determination of whether the moving object is moving toward or away from the doorbell 130. For example, if it is determined that the magnitude of the output signal from the PIR sensors 144 is increasing, which is indicative of the moving object moving toward the doorbell 130, then it may also be determined whether the number of the PIR sensors 144 that detect the moving object is increasing, which it should be if the moving object is in fact moving toward the doorbell 110. Conversely, if it is determined that the number of the PIR sensors 144 that detect the moving object is increasing, which is indicative of the moving object moving toward the doorbell 130, then it may also be determined whether the magnitude of the output signal from the PIR sensors 144 is increasing, which it should be if the moving object is in fact moving toward the doorbell 130. If, in either case, the determinations (magnitude of output signal vs. number of PIR sensors) contradict one another, the process may loop back and repeat one or more steps before making a final determination whether the moving object is moving toward or away from the doorbell 130.

Figure 28:
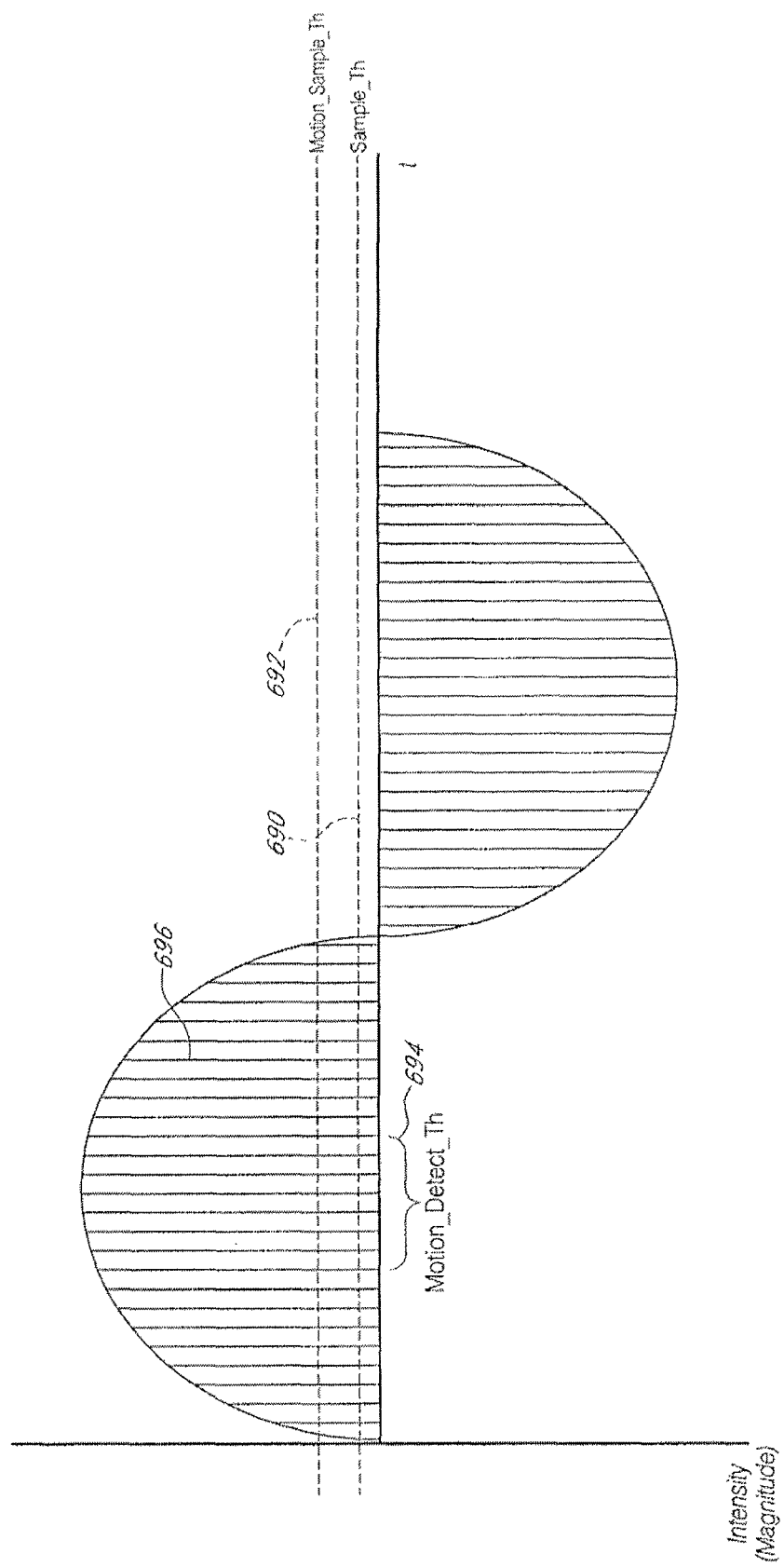
FIG. 28 is a graph illustrating another process for an A/V recording and communication device according to the present embodiments.

FIG. 28 illustrates three different thresholds that may be used in one or more motion detection algorithms, according to various aspects of the present disclosure. One threshold, which is labeled Sample_Th in FIG. 28 and represented by the lower dashed line 690, is a minimum magnitude that an output signal from the PIR sensors 144 must measure in order to be considered in any of the motion detection algorithms of the present embodiments. In other words, the present motion detection algorithms may ignore any output signals from the PIR sensors 144 that are below the Sample_Th threshold.

Another threshold, which is labeled Motion_Sample_Th in FIG. 28 and represented by the upper dashed line 692, is a minimum magnitude that an output signal from the PIR sensors 144 must measure in order to be considered indicative of motion. In other words, output signals from the PIR sensors 144 that are above the Sample_Th threshold, but below the Motion_Sample_Th threshold, are considered by the motion detection algorithms of the present embodiments to be not necessarily indicative of motion, whereas output signals from the PIR sensors 144 that are above the Motion_Sample_Th threshold are considered by the motion detection algorithms of the present embodiments to be indicative of motion.

Another threshold, which is labeled Motion_Detect_Th in FIG. 28 and represented by the bracket 694, is a minimum number of sampling intervals 696 of the output signal from the PIR sensors 144 in a given window of time that must be indicative of motion in order to determine that motion is actually present in the field of view of the doorbell 130. For example, if a time window of 2 seconds is considered, and if the value of Motion_Detect_Th is set to 12, then the microcontroller 163 will generate a motion alert if at least 12 sampling intervals 696 during the 2 second window are above the Motion_Sample_Th threshold. In some embodiments, the value of Motion_Detect_Th may be preset.

In certain embodiments, samples of the output signal from the PIR sensors 144 that fall between the Sample_Th threshold and the Motion_Sample_Th threshold may be considered in determining whether motion is actually happening in the field of view of the doorbell 130. For example, some moving objects, such as objects that are moving very slowly, may only generate output signals from the PIR sensors 144 that are above the Motion_Sample_Th threshold for a short time. If these output signals remain above the Motion_Sample_Th threshold for such a short time that not enough samples can be taken to meet the Motion_Detect_Th threshold, then the output signals above the Motion_Sample_Th threshold may not be counted as actual motion, even though motion is actually happening in the field of view of the doorbell 130. In such situations, some of the present embodiments may consider the output signals from the PIR sensors 144 that fall between the Sample_Th threshold and the Motion_Sample_Th threshold in determining whether motion is actually happening in the field of view of the doorbell 130.

The present embodiments have been described with reference to the doorbell 130 illustrated in FIGS. 2-12. It should be understood, however, that the present embodiments are equally applicable to any A/V recording and communication device that is capable of recording video footage and/or audio and transmitting the recorded video footage and/or audio via a wireless and/or wired connection. In certain embodiments, for example, the A/V recording and communication device may not be a doorbell, but may be, for example, a wireless A/V recording and communication security camera. An example A/V recording and communication security camera may include substantially all of the structure and functionality of the doorbell 130, but without the front button 133, the button actuator, and/or the light pipe 136. An example A/V recording and communication security camera may further omit other components, such as, for example, the bracket PCB 149 and its components.

Figure 29:
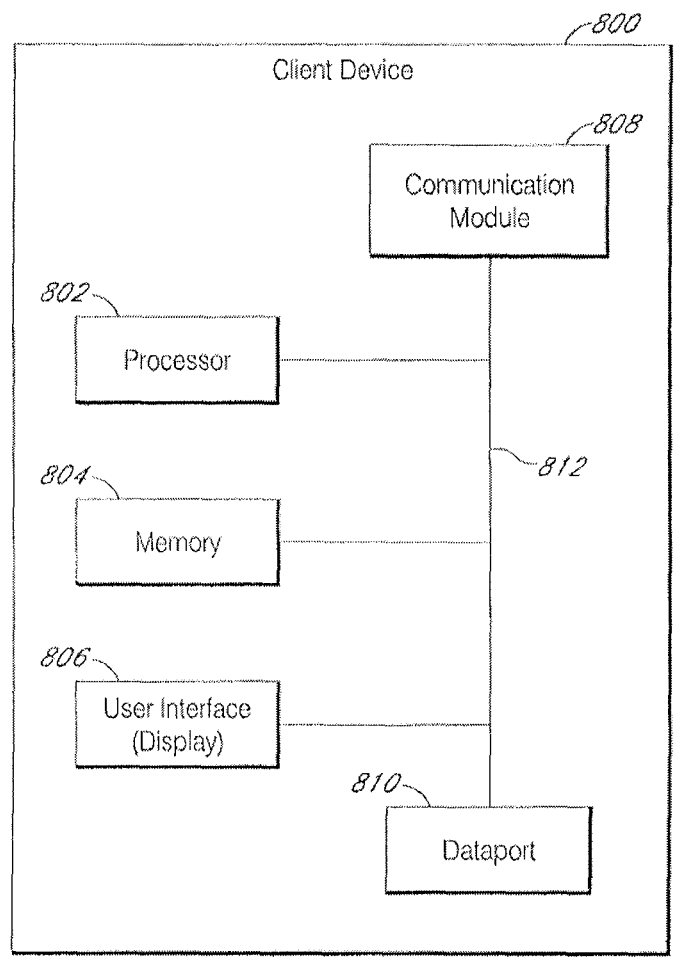
FIG. 29 is a functional block diagram of a client device on which the present embodiments may be implemented according to various aspects of the present disclosure.

FIG. 29 is a functional block diagram of a client device 850 on which the present embodiments may be implemented according to various aspects of the present disclosure. The user's client device 114 described with reference to FIG. 1 may include some or all of the components and/or functionality of the client device 850. The client device 850 may comprise, for example, a smartphone.

With reference to FIG. 29, the client device 850 includes a processor 852, a memory 854, a user interface 856, a communication module 858, and a dataport 860. These components are communicatively coupled together by an interconnect bus 862. The processor 852 may include any processor used in smartphones and/or portable computing devices, such as an ARM processor (a processor based on the RISC (reduced instruction set computer) architecture developed by Advanced RISC Machines (ARM).). In some embodiments, the processor 852 may include one or more other processors, such as one or more conventional microprocessors, and/or one or more supplementary co-processors such as math co-processors.

The memory 854 may include both operating memory, such as random access memory (RAM), as well as data storage, such as read-only memory (ROM), hard drives, flash memory, or any other suitable memory/storage element. The memory 854 may include removable memory elements, such as a CompactFlash card, a MultiMediaCard (MMC), and/or a Secure Digital (SD) card. In some embodiments, the memory 854 may comprise a combination of magnetic, optical, and/or semiconductor memory, and may include, for example, RAM, ROM, flash drive, and/or a hard disk or drive. The processor 852 and the memory 854 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 852 may be connecter to the memory 854 via the dataport 860.

The user interface 856 may include any user interface or presentation elements suitable for a smartphone and/or a portable computing device, such as a keypad, a display screen, a touchscreen, a microphone, and a speaker. The communication module 858 is configured to handle communication links between the client device 850 and other, external devices or receivers, and to route incoming/outgoing data appropriately. For example, inbound data from the dataport 860 may be routed through the communication module 858 before being directed to the processor 852, and outbound data from the processor 852 may be routed through the communication module 858 before being directed to the dataport 860. The communication module 858 may include one or more transceiver modules capable of transmitting and receiving data, and using, for example, one or more protocols and/or technologies, such as GSM, UMTS (3GSM; IS-95 (CDMA one), IS-2000 (CDMA 2000), LTE, FDMA, TDMA, W-CDMA, CDMA, OFDMA, Wi-Fi, or any other protocol and/or technology.

The dataport 860 may be any type of connector used for physically interfacing with a smartphone and/or a portable computing device, such as a mini-USB port or an IPHONE®/IPOD® 30-pin connector or LIGHTNING® connector. In other embodiments, the dataport 860 may include multiple communication channels for simultaneous communication with, for example, other processors, servers, and/or client terminals.

The memory 854 may store instructions for communicating with other systems, such as a computer. The memory 854 may store, for example, a program (e.g., computer program code) adapted to direct the processor 852 in accordance with the present embodiments. The instructions also may include program elements, such as an operating system. While execution of sequences of instructions in the program causes the processor 852 to perform the process steps described herein, hard wired circuitry may be used in place of, or in combination with, software/firmware instructions for implementation of the processes of the present embodiments. Thus, the present embodiments are not limited to any specific combination of hardware and software.

Figure 30:
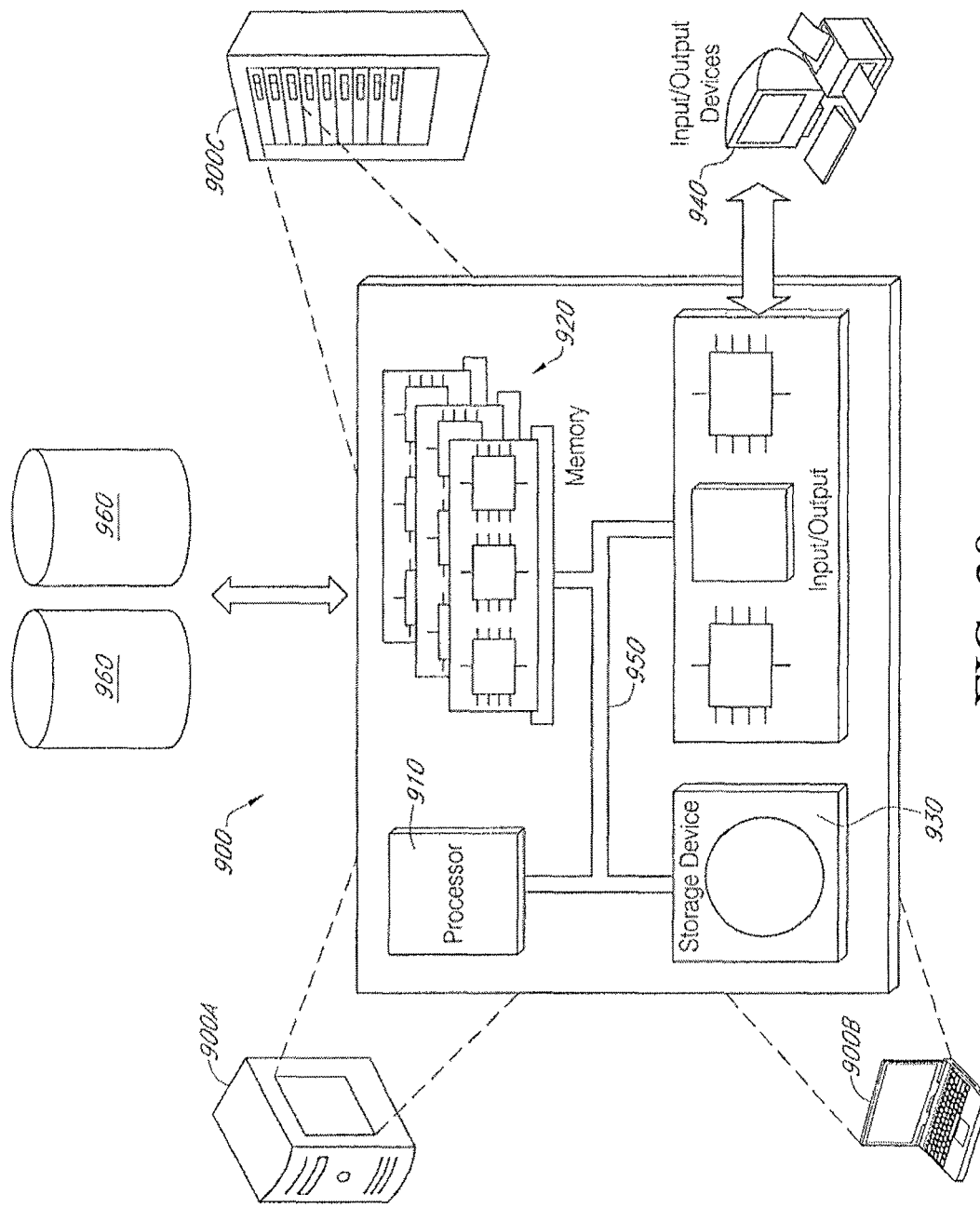
FIG. 30 is a functional block diagram of a general-purpose computing system on which the present embodiments may be implemented according to various aspects of present disclosure.

FIG. 30 is a functional block diagram of a general-purpose computing system on which the present embodiments may be implemented according to various aspects of the present disclosure. The computer system 900 may execute at least some of the operations described above. The computer system 900 may be embodied in at least one of a personal computer (also referred to as a desktop computer) 900A, a portable computer (also referred to as a laptop or notebook computer) 900B, and/or a server 900C. A server is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 900 may include at least one processor 910, memory 920, at least one storage device 930, and input/output (I/O) devices 940. Some or all of the components 910, 920, 930, 940 may be interconnected via a system bus 950. The processor 910 may be single- or multi-threaded and may have one or more cores. The processor 910 may execute instructions, such as those stored in the memory 920 and/or in the storage device 930. Information may be received and output using one or more I/O devices 940.

The memory 920 may store information, and may be a computer-readable medium, such as volatile or non-volatile memory. The storage device(s) 930 may provide storage for the system 900, and may be a computer-readable medium. In various aspects, the storage device(s) 930 may be a flash memory device, a hard disk device, an optical disk device, a tape device, or any other type of storage device.

The I/O devices 940 may provide input/output operations for the system 900. The I/O devices 940 may include a keyboard, a pointing device, and/or a microphone. The I/O devices 940 may further include a display unit for displaying graphical user interfaces, a speaker, and/or a printer. External data may be stored in one or more accessible external databases 960.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magnesto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the stops in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. A method for an audio/video (A/V) recording and communication device, the A/V recording and communication device including a processor, a motion sensor, and a camera, the method comprising:
   the motion sensor gathering information from within a field of view of the motion sensor and generating an output signal;
   at a beginning of a sampling interval, the processor transitioning from a low-power state to an active state;
   in response to transitioning to the active state, the processor analyzing the output signal that is generated by the motion sensor during the sampling interval to determine whether motion is indicated within the field of view of the motion sensor;
   at an end of the sampling interval, the processor transitioning from the active state to the low-power state; and
   when motion is indicated within the field of view of the motion sensor, then powering up the camera of the A/V recording and communication device.

2. The method of claim 1, wherein sampling intervals occur every 15.625 ms.

3. The method of claim 1, wherein powering up the camera includes powering up at least one of a camera processor and an image sensor.

4. The method of claim 1, wherein the motion sensor comprises at least one passive infrared (PIR) sensor.

5. The method of claim 1, wherein, when motion is indicated within the field of view of the motion sensor, then the processor generates a signal to power up the at least one other component of the A/V recording and communication device, and the at least one other component of the A/V recording and communication device powers up in response to the signal from the processor.

6. The method of claim 1 further comprising when motion is indicated within the field of view of the motion sensor, then powering up a Wi-Fi chip.

7. An audio/video (A/V) recording and communication device, comprising:
   a processor;
   a motion sensor configured to gather information from within a field of view of the motion sensor and to generate an output signal based on the gathered information;
   a camera; and
   memory storing instructions that, when executed by the processor, cause the processor to:
      at a beginning of a sampling interval, transition from a low-power state to an active state;
      during the sampling interval, analyze the output signal that is generated by the motion sensor during the sampling interval to determine whether motion is indicated in the field of view of the motion sensor;
      upon determining that motion is not indicated in the field of view of the motion sensor, revert to the low-power state from the active state; and
      upon determining that motion is indicated in the field of view of the motion sensor, power up the camera of the A/V recording and communication device.

8. The A/V recording and communication device of claim 7, wherein sampling intervals occur every 15.625 ms.

9. The A/V recording and communication device of claim 7, wherein the memory stores further instructions that, when executed by the processor, cause the processor to power up the camera by powering up at least one of a camera processor and an image sensor.

10. The A/V recording and communication device of claim 7, wherein the motion sensor comprises at least one passive infrared (PIR) sensor.

11. The A/V recording and communication device of claim 7, wherein the memory stores further instructions that, when executed by the processor, cause the processor to, when motion is indicated within the field of view of the motion sensor, generate a signal to power up the camera, and the camera is further configured to power up in response to the signal from the processor.

12. The A/V recording and communication device of claim 7, wherein the memory stores further instructions that, when executed by the processor, cause the processor to, upon determining that motion is indicated in the field of view of the motion sensor, power up a Wi-Fi chip.

13. An audio/video (A/V) recording and communication device, comprising:
   a processor;
   a motion sensor configured to gather information from within a field of view of the motion sensor and to generate an output signal based on the gathered information;
   a camera; and
   memory storing instructions that, when executed by the processor, cause the processor to:
      transition, at a beginning of a sampling interval, from a low-power state to an active state without receiving an interrupt signal from the motion sensor;
      sample the output signal from the motion sensor that is generated during the sampling interval;
      analyze the sampled output signal to determine whether motion is indicated within the field of view of the motion sensor during the sampling interval;
      if no motion is indicated within the field of view of the motion sensor, then revert to the low-power state; and
      if motion is indicated within the field of view of the motion sensor, then power up the camera of the A/V recording and communication device.

14. The A/V recording and communication device of claim 13, wherein the memory stores further instructions that, when executed by the processor, cause the processor to, if the processor reverts to the low-power state, then wait until a next sampling interval and again transition, at a beginning of the next sampling interval, from the low-power state to the active state without receiving an interrupt signal from the motion sensor, and again sample the output signal from the motion sensor that is generated during the next sampling interval.

15. The A/V recording and communication device of claim 13, wherein the memory stores further instructions that, when executed by the processor, cause the processor to power up the camera by powering up at least one of a camera processor and an image sensor.

16. The A/V recording and communication device of claim 13, wherein the motion sensor comprises at least one passive infrared (PIR) sensor.

17. The A/V recording and communication device of claim 13, wherein the memory stores further instructions that, when executed by the processor, cause the processor to, when motion is indicated within the field of view of the motion sensor, then generate a signal to power up the camera of the A/V recording and communication device, and the camera of the A/V recording and communication device is further configured to power up in response to the signal from the processor.

18. The A/V recording and communication device of claim 13, wherein the memory stores further instructions that, when executed by the processor, cause the processor to, if motion is indicated within the field of view of the motion sensor, power up a Wi-Fi chip.

\* \* \* \* \*